US010296010B2

(12) United States Patent
Cohen

(10) Patent No.: US 10,296,010 B2
(45) Date of Patent: May 21, 2019

(54) NAVIGATING A VEHICLE BASED ON A DETECTED BARRIER

(71) Applicant: Mobileye Vision Technologies Ltd., Jerusalem (IL)

(72) Inventor: Barak Cohen, Modiin (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 84 days.

(21) Appl. No.: 15/630,203

(22) Filed: Jun. 22, 2017

(65) Prior Publication Data

US 2018/0101177 A1  Apr. 12, 2018

Related U.S. Application Data

(60) Provisional application No. 62/406,604, filed on Oct. 11, 2016.

(51) Int. Cl.
  *G05D 1/02* (2006.01)
  *G06K 9/00* (2006.01)
  (Continued)

(52) U.S. Cl.
  CPC .......... *G05D 1/0246* (2013.01); *G01C 21/34* (2013.01); *G06K 9/00791* (2013.01);
  (Continued)

(58) Field of Classification Search
  CPC .......... G06K 9/00791; G06K 9/00798; G06K 9/00805; G06T 2207/30256; G06T 2207/30261; G05D 1/0231; G05D 1/0246; G08G 1/165; G08G 1/166; G08G 1/167; B60T 2201/08; B60T 2201/089
  See application file for complete search history.

(56) References Cited

U.S. PATENT DOCUMENTS

| 2010/0030473 A1* | 2/2010 | Au et al. ............... G01S 17/936 |
| | | 701/301 |
| 2010/0104199 A1 | 4/2010 | Zhang et al. ................. 382/199 |

(Continued)

OTHER PUBLICATIONS

International Search Report and Written Opinion issued by the European Patent Office dated Nov. 3, 2017, in counterpart International Application No. PCT/IB2017/000895 (14 pages).

*Primary Examiner* — Andrew W Johns
(74) *Attorney, Agent, or Firm* — Finnegan, Henderson, Farabow, Garrett & Dunner, LLP

(57) ABSTRACT

Systems and methods are provided for navigating an autonomous vehicle. In one implementation, a system for navigating a vehicle includes at least one processing device programmed to receive, from an image capture device, a plurality of images associated with an environment of the vehicle, analyze at least one of the plurality of images to identify a navigable region in the environment of the vehicle, identify, based on the at least one of the plurality of images, at least one barrier associated with an edge of the navigable region, and determine a type of the at least one barrier. The at least one processing device is also programmed to determine a navigational path of the vehicle based on the determined type of the at least one barrier, and cause the vehicle to travel on at least a portion of the determined navigational path.

20 Claims, 27 Drawing Sheets

(51) Int. Cl.
  *G07C 5/00* (2006.01)
  *G08G 1/16* (2006.01)
  *H04N 7/18* (2006.01)
  *G01C 21/34* (2006.01)

(52) U.S. Cl.
  CPC ..... *G06K 9/00798* (2013.01); *G06K 9/00805* (2013.01); *G07C 5/008* (2013.01); *G08G 1/165* (2013.01); *G08G 1/166* (2013.01); *H04N 7/181* (2013.01)

(56) References Cited

U.S. PATENT DOCUMENTS

| | | | |
|---|---|---|---|
| 2015/0151725 A1 | 6/2015 | Clarke et al. | B60T 7/12 |
| 2015/0197246 A1* | 7/2015 | Nagasaka et al. | B60W 30/10 701/1 |
| 2015/0210312 A1 | 7/2015 | Stein et al. | B62D 6/00 |
| 2015/0278614 A1* | 10/2015 | Lee | G06K 9/00798 348/148 |

* cited by examiner

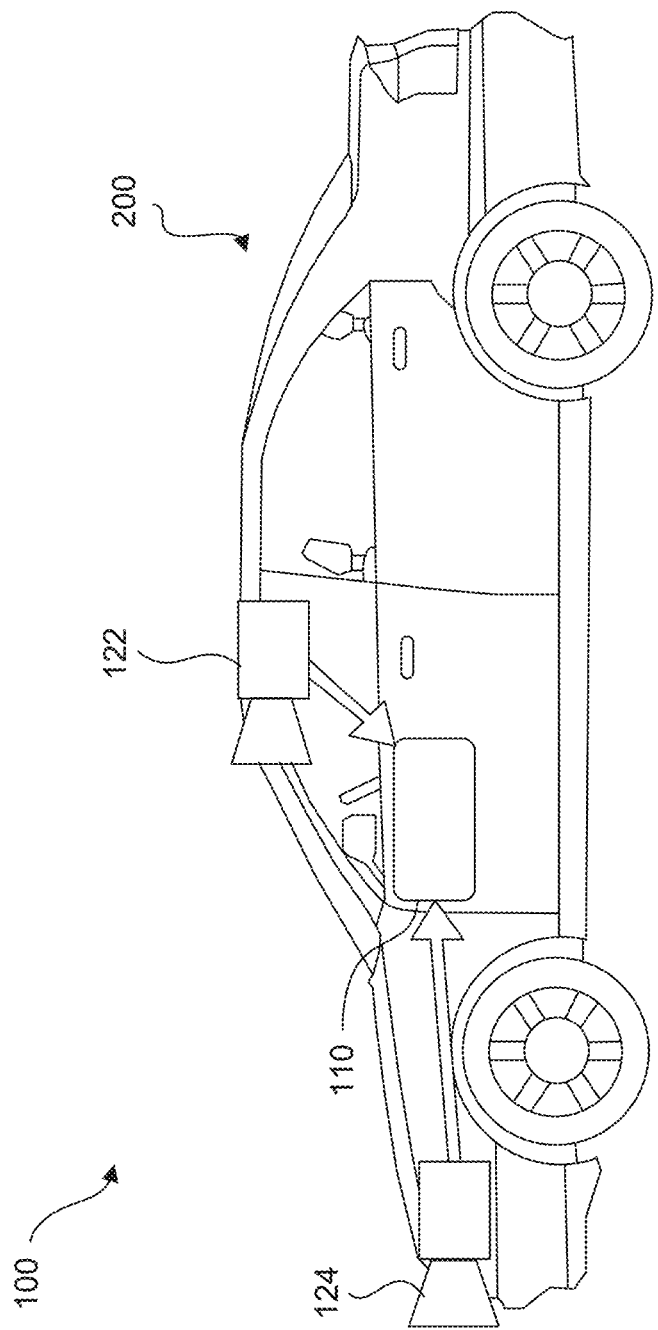

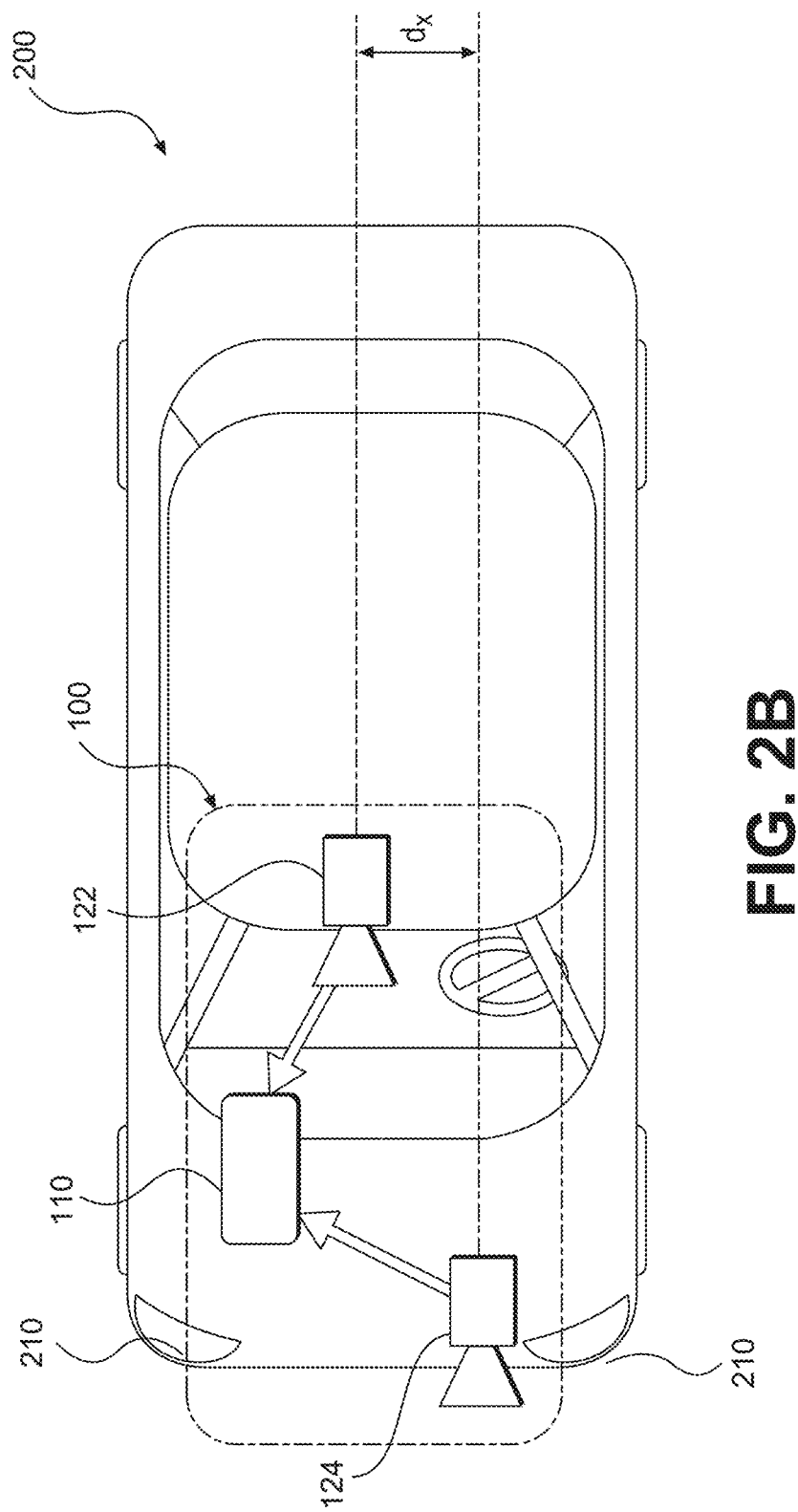

NAVIGATING A VEHICLE BASED ON A DETECTED BARRIER

CROSS REFERENCE TO RELATED APPLICATION

This application claims the benefit of priority of U.S. Provisional Patent Application No. 62/406,604, filed on Oct. 11, 2016. The foregoing application is incorporated herein by reference in its entirety.

BACKGROUND

Technical Field

The present disclosure relates generally to autonomous vehicle navigation. Additionally, this disclosure relates to systems and methods for navigating a vehicle based on a detected barrier.

Background Information

As technology continues to advance, the goal of a fully autonomous vehicle that is capable of navigating on roadways is on the horizon. Autonomous vehicles may need to take into account a variety of factors and make appropriate decisions based on those factors to safely and accurately reach an intended destination. For example, an autonomous vehicle may need to process and interpret visual information (e.g., information captured from a camera), information from radar or lidar, and may also use information obtained from other sources (e.g., from a GPS device, a speed sensor, an accelerometer, a suspension sensor, etc.). At the same time, in order to navigate to a destination, an autonomous vehicle may also need to identify its location within a particular roadway (e.g., a specific lane within a multi-lane road), navigate alongside other vehicles, avoid obstacles and pedestrians, observe traffic signals and signs, travel from one road to another road at appropriate intersections or interchanges, and respond to any other situation that occurs or develops during the vehicle's operation. Unexpected appearances of obstacles or pedestrians at a relatively short distance forward of the vehicle may pose a challenge for the autonomous vehicle. In such case, the autonomous vehicle may need to quickly analyze an environment of the vehicle and determine a viable navigable path for the vehicle to avoid an accident and/or minimize damage.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle. The disclosed systems may provide a navigational response based on, for example, an analysis of images captured by one or more of the cameras. The navigational response may also take into account other data including, for example, global positioning system (GPS) data, sensor data (e.g., from an accelerometer, a speed sensor, a suspension sensor, etc.), and/or other map data.

In some embodiments, a system for navigating a vehicle may include at least one processing device programmed to receive, from an image capture device, a plurality of images associated with an environment of the vehicle, analyze at least one of the plurality of images to identify a navigable region in the environment of the vehicle, identify, based on the at least one of the plurality of images, at least one barrier associated with an edge of the navigable region, and determine a type of the at least one barrier. The at least one processing device is also programmed to determine a navigational path of the vehicle based on the determined type of the at least one barrier, and cause the vehicle to travel on at least a portion of the determined navigational path.

In other embodiments, a system for navigating a vehicle includes at least one processing device programmed to receive, from an image capture device, a plurality of images associated with an environment of the vehicle, analyze at least one of the plurality of images to identify a navigable region in the environment of the vehicle, identify, based on the at least one of the plurality of images, a first barrier associated with at least one edge of the navigable region and a second barrier associated with at least one edge of the navigable region, and determine a type of the first barrier and a type of the second barrier. The determined type of the first barrier includes a traversable barrier and the determined type of the second barrier includes a non-traversable barrier. The at least one processing device is also programmed to determine a navigational path of the vehicle based on the determined types of the first barrier and the second barrier. The determined navigational path includes traveling through the first barrier in order to avoid the second barrier. The at least one processing device is further programmed to cause the vehicle to travel on at least a portion of the determined navigational path.

In other embodiments, a method for navigating a vehicle includes receiving, from an image capture device, a plurality of images associated with an environment of the vehicle, analyzing at least one of the plurality of images to identify a navigable region in the environment of the vehicle, identifying based on the at least one of the plurality of images, at least one barrier associated with an edge of the navigable region, determining a type of the at least one barrier, determining a navigational path of the vehicle based on the determined type of the at least one barrier, and causing the vehicle to travel on at least a portion of the determined navigational path.

In yet other embodiments, a method for navigating a vehicle includes receiving, from an image capture device, a plurality of images associated with an environment of the vehicle, analyzing at least one of the plurality of images to identify a navigable region in the environment of the vehicle, identifying, based on the at least one of the plurality of images, a first barrier associated with at least one edge of the navigable region and a second barrier associated with at least one edge of the navigable region, and determining a type of the first barrier and a type of the second barrier. The determined type of the first barrier includes a traversable barrier and the determined type of the second barrier includes a non-traversable barrier. The method also includes determining a navigational path of the vehicle based on the determined types of the first barrier and the second barrier. The determined navigational path includes traveling through the first barrier in order to avoid the second barrier. The method further includes causing the vehicle to travel on at least a portion of the determined navigational path.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 2A is a diagrammatic side view representation of an exemplary vehicle including a system consistent with the disclosed embodiments.

FIG. 2B is a diagrammatic top view representation of the vehicle and system shown in FIG. 2A consistent with the disclosed embodiments.

DETAILED DESCRIPTION

Figure 1:
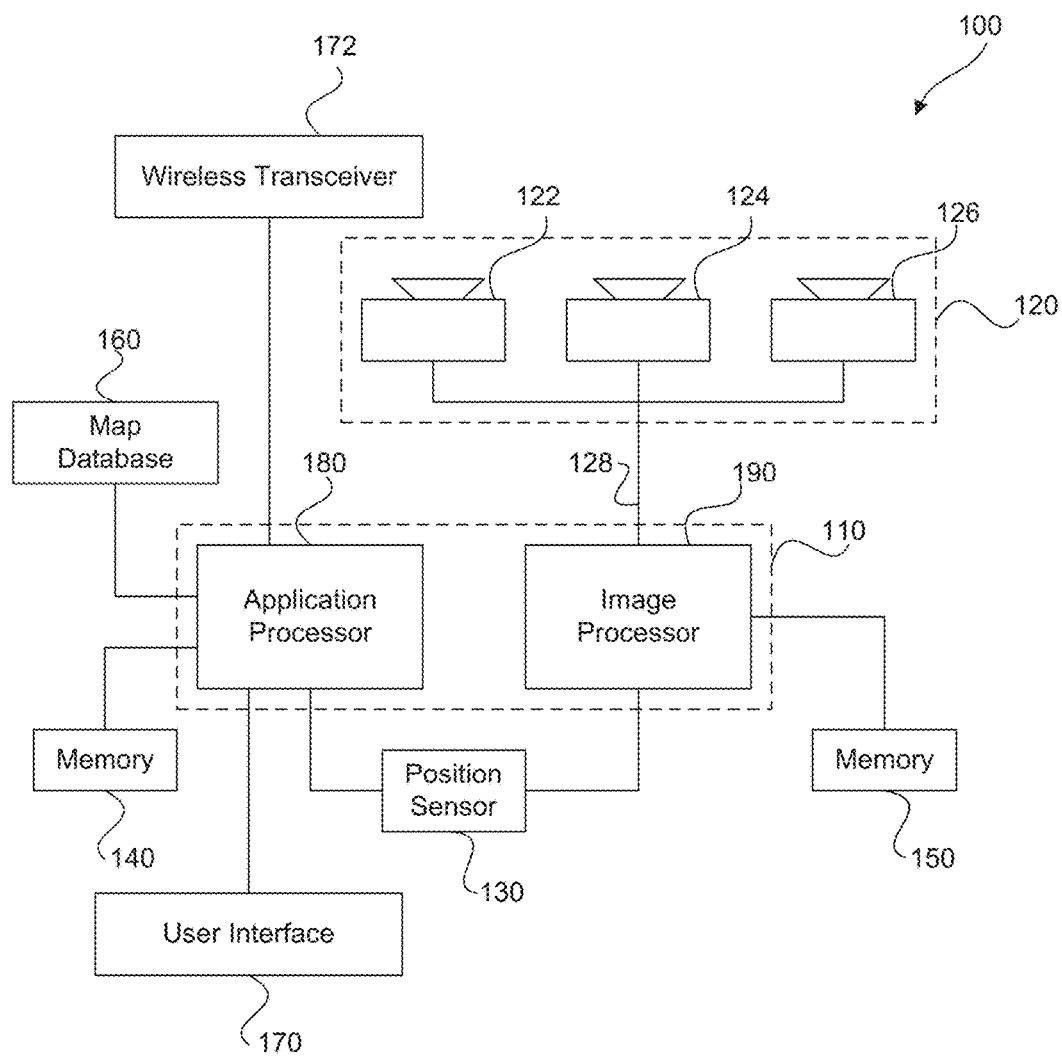
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration/deceleration of the vehicle. To be autonomous, a vehicle need not be fully automatic (e.g., fully operational without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects to the driver (e.g., braking or braking under certain circumstances). In some cases, autonomous vehicles may handle some or all aspects of braking, speed control, and/or steering of the vehicle.

As human drivers typically rely on visual cues and observations in order to control a vehicle, transportation infrastructures are built accordingly, with lane markings, traffic signs, and traffic lights designed to provide visual information to drivers. In view of these design characteristics of transportation infrastructures, an autonomous vehicle may include a camera and a processing unit that analyzes visual information captured from the environment of the vehicle. The visual information may include, for example, images representing components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while it is traveling, and the vehicle (as well as other vehicles) may use the information to localize itself on the model. Some vehicles can also be capable of communication among them, sharing information, altering the peer vehicle of hazards or changes in the vehicles' surroundings, etc.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras, CCDs, or any other type of image sensor), such as image capture device 122, image capture device 124, and image capture device 126. System 100 may also include a data interface 128 communicatively connecting processing unit 110 to image acquisition unit 120. For example, data interface 128 may include any wired and/or wireless link or links for transmitting image data acquired by image acquisition unit 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802.15.4, ZigBee, etc.). Such transmissions can include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 180 and image processor 190 may include various types of hardware-based processing devices. For example, either or both of applications processor 180 and image processor 190 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments. In other examples, the EyeQ4® and/or the the EyeQ5® may be used in the disclosed embodiments. Of course, any newer or future EyeQ processing devices may also be used together with the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware based components of a host vehicle.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software, as well as a trained system, such as a neural network, or a deep neural network, for example. The memory units may include random access memory, read only memory, flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a speedometer) for measuring a speed of vehicle 200. System 100 may also include one or more accelerometers (either single axis or multiaxis) for measuring accelerations of vehicle 200 along one or more axes.

The memory units 140, 150 may include a database, or data organized in any other form, that indication a location of known landmarks. Sensory information (such as images, radar signal, depth information from lidar or stereo processing of two or more images) of the environment may be processed together with position information, such as a GPS coordinate, vehicle's ego motion, etc. to determine a current location of the vehicle relative to the known landmarks, and refine the vehicle location. Certain aspects of this technology are included in a localization technology known as REM™, which is being marketed by the assignee of the present application.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.). In some cases, map database 160 may store a sparse data model including polynomial representations of certain road features (e.g., lane markings) or target trajectories for the host vehicle. Map database 160 may also include stored representations of various recognized landmarks that may be used to determine or update a known position of the host vehicle with respect to a target trajectory. The landmark representations may include data fields such as landmark type, landmark location, among other potential identifiers.

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

One or more cameras (e.g., image capture devices 122, 124, and 126) may be part of a sensing block included on a vehicle. Various other sensors may be included in the sensing block, and any or all of the sensors may be relied upon to develop a sensed navigational state of the vehicle. In addition to cameras (forward, sideward, rearward, etc), other sensors such as RADAR, LIDAR, and acoustic sensors may be included in the sensing block. Additionally, the sensing block may include one or more components configured to communicate and transmit/receive information relating to the environment of the vehicle. For example, such components may include wireless transceivers (RF, etc.) that may receive from a source remotely located with respect to the host vehicle sensor based information or any other type of information relating to the environment of the host vehicle. Such information may include sensor output information, or related information, received from vehicle systems other than the host vehicle. In some embodiments, such information may include information received from a remote computing device, a centralized server, etc. Furthermore, the cameras may take on many different configurations: single camera units, multiple cameras, camera clusters, long FOV, short FOV, wide angle, fisheye, etc.

Figure 2C:
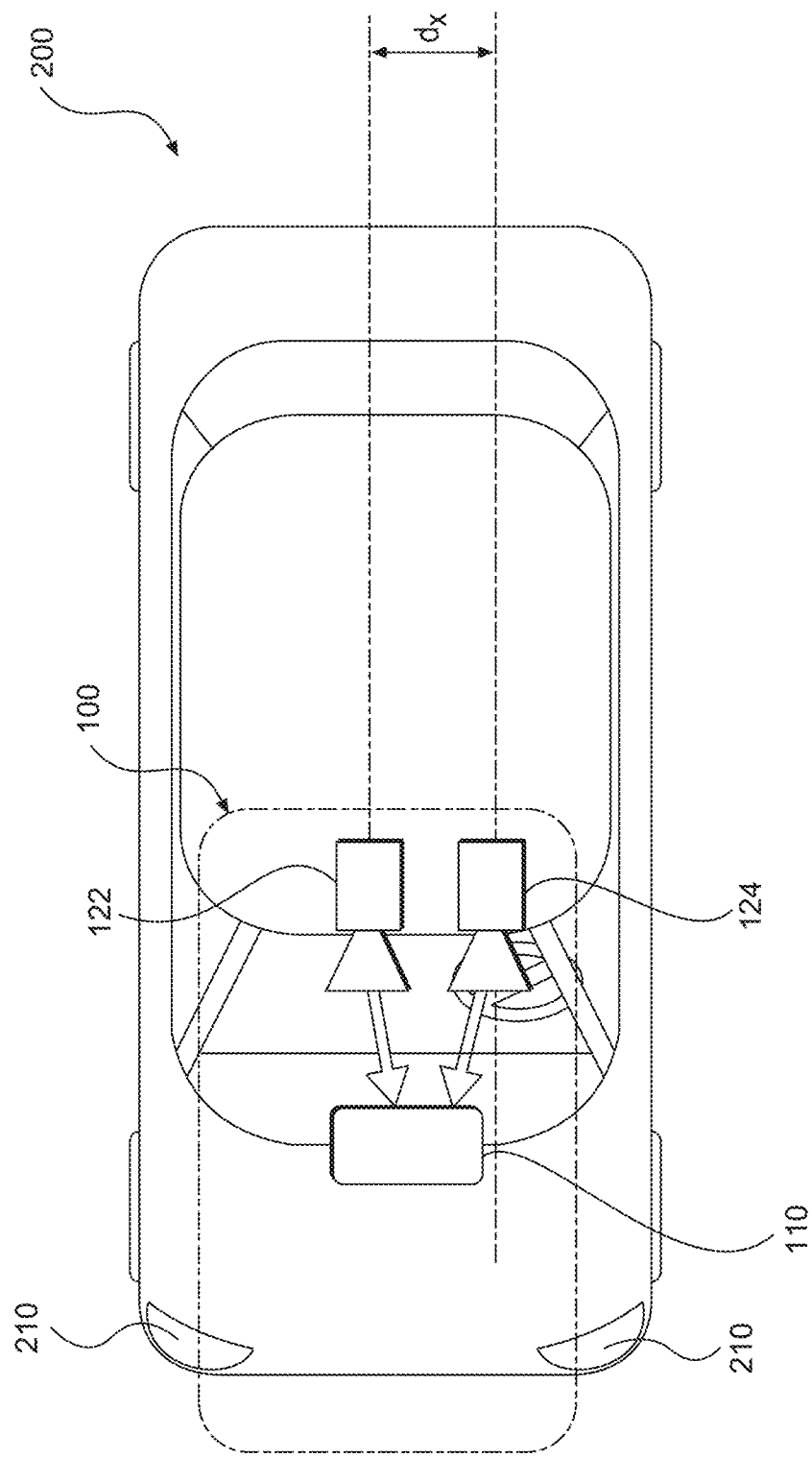
FIG. 2C is a diagrammatic top view representation of another embodiment of a vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light fixtures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers, and download data from the one or more servers. Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead transmit data, such as captured images and/or limited location information related to a route.

Other privacy levels are contemplated as well. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
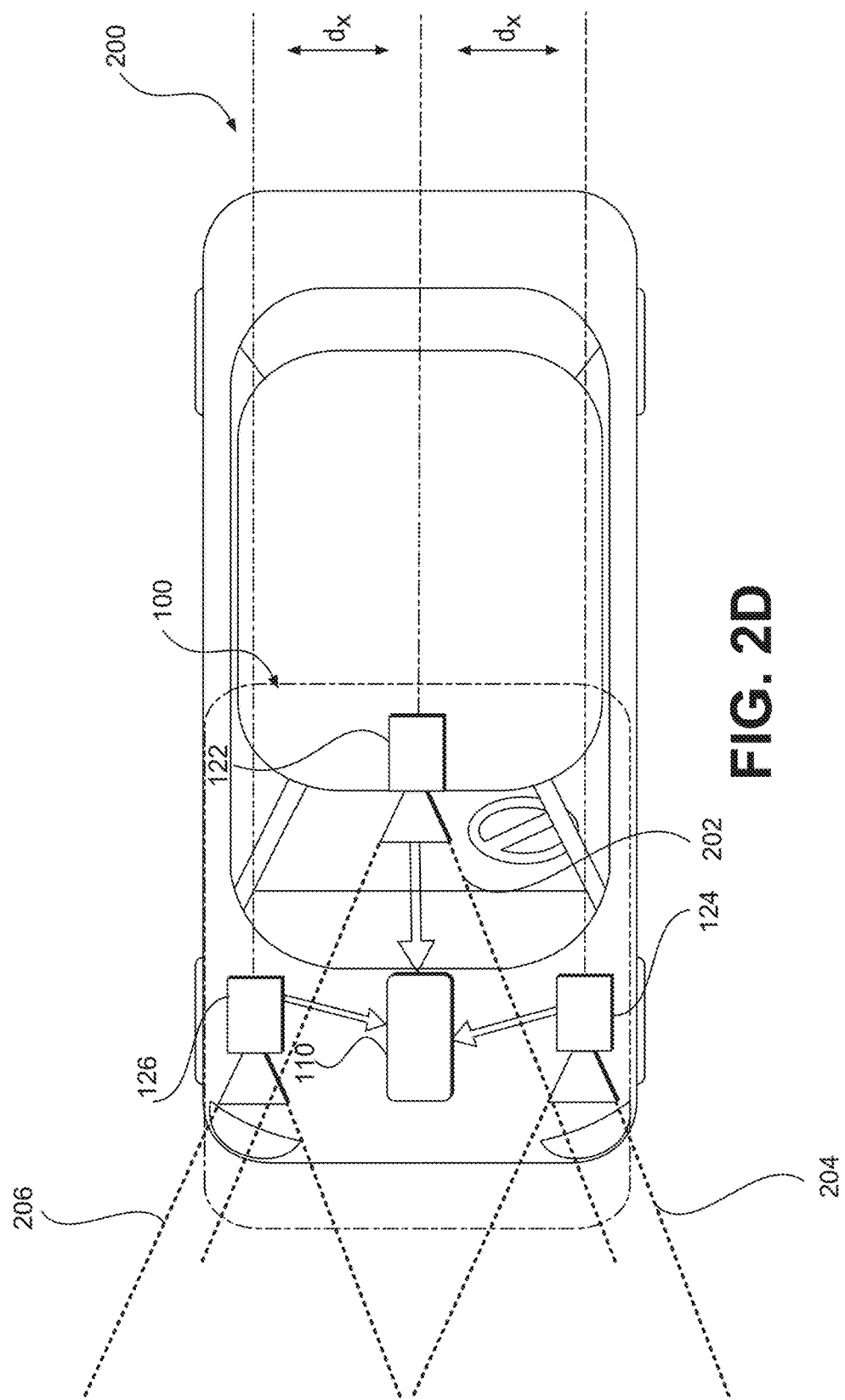
FIG. 2D is a diagrammatic top view representation of yet another embodiment of a vehicle including a system consistent with the disclosed embodiments.
Figure 2E:
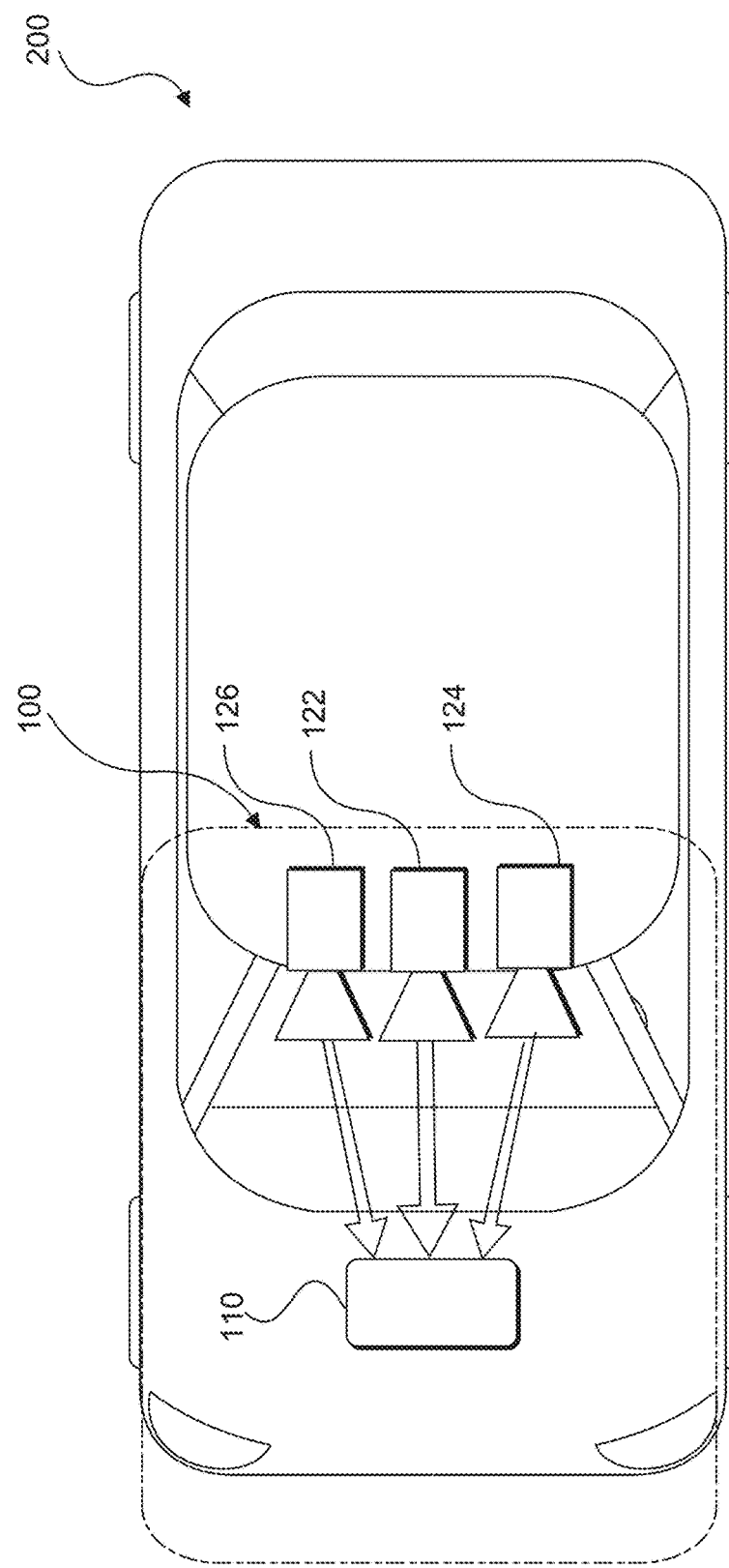
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV. In some embodiments, image capture device 122 may be a 7.2M pixel image capture device with an aspect ratio of about 2:1 (e.g., H×V=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126) disclosed herein may constitute a high resolution imager and may have a resolution greater than 5M pixel, 7M pixel, 10M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280×960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV image capture device 122.

Figure 2F:
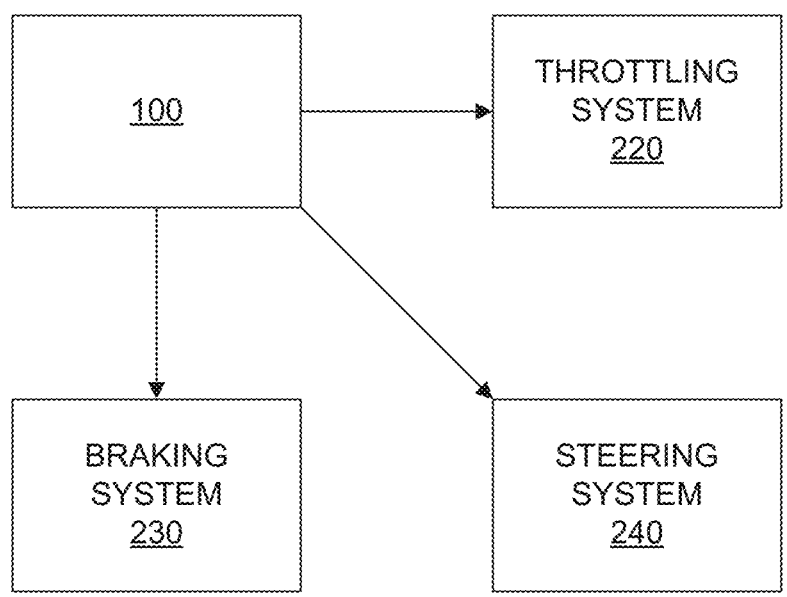
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
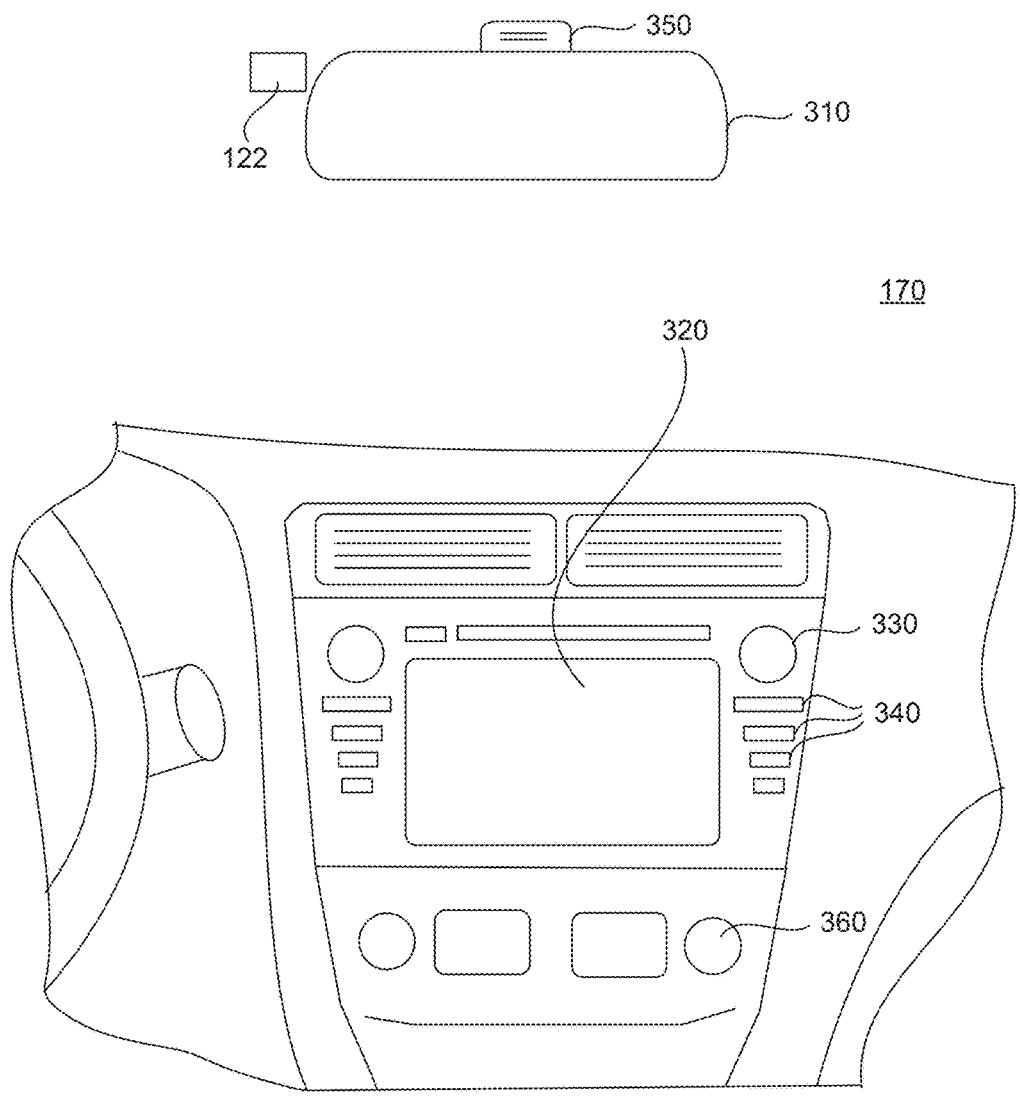
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
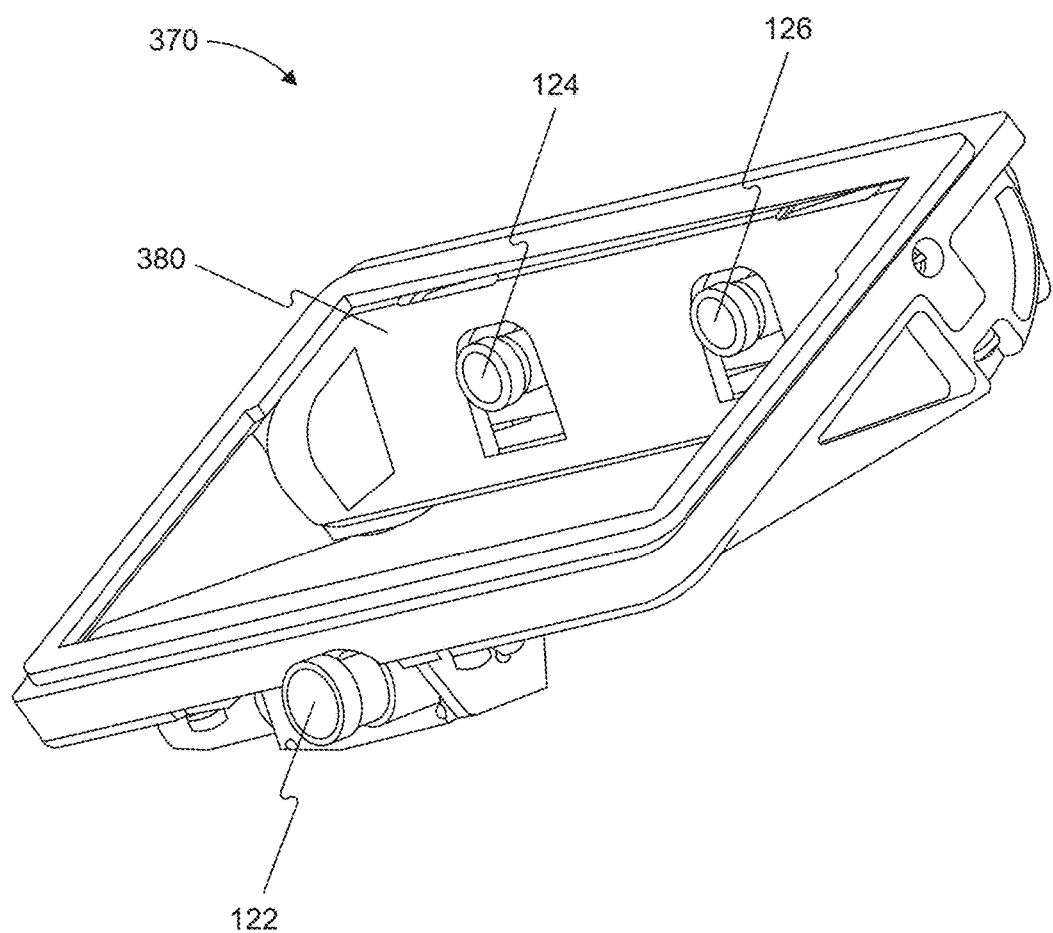
FIG. 3B is an illustration of an example of a camera mount that is configured to be positioned behind a rearview mirror and against a vehicle windshield consistent with the disclosed embodiments.
Figure 3C:
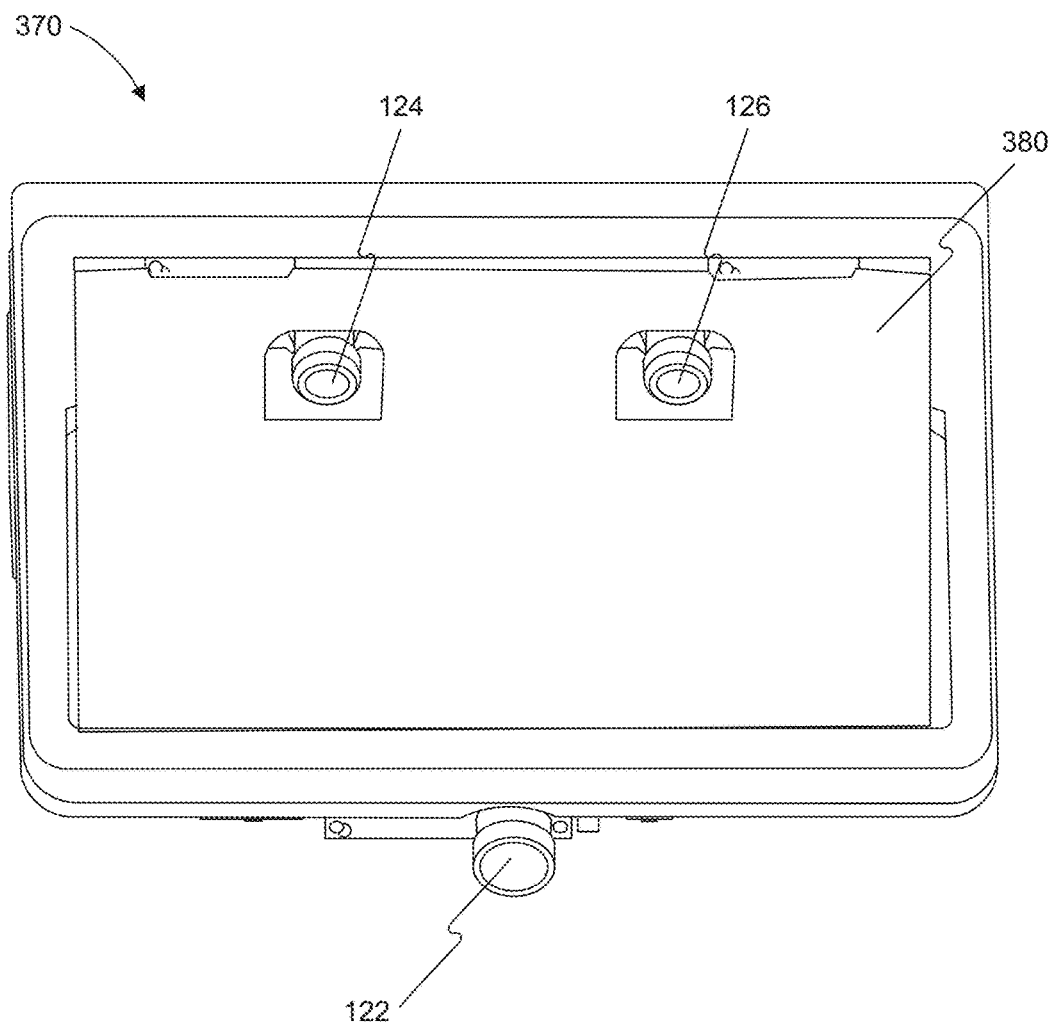
FIG. 3C is an illustration of the camera mount shown in FIG. 3B from a different perspective consistent with the disclosed embodiments.
Figure 3D:
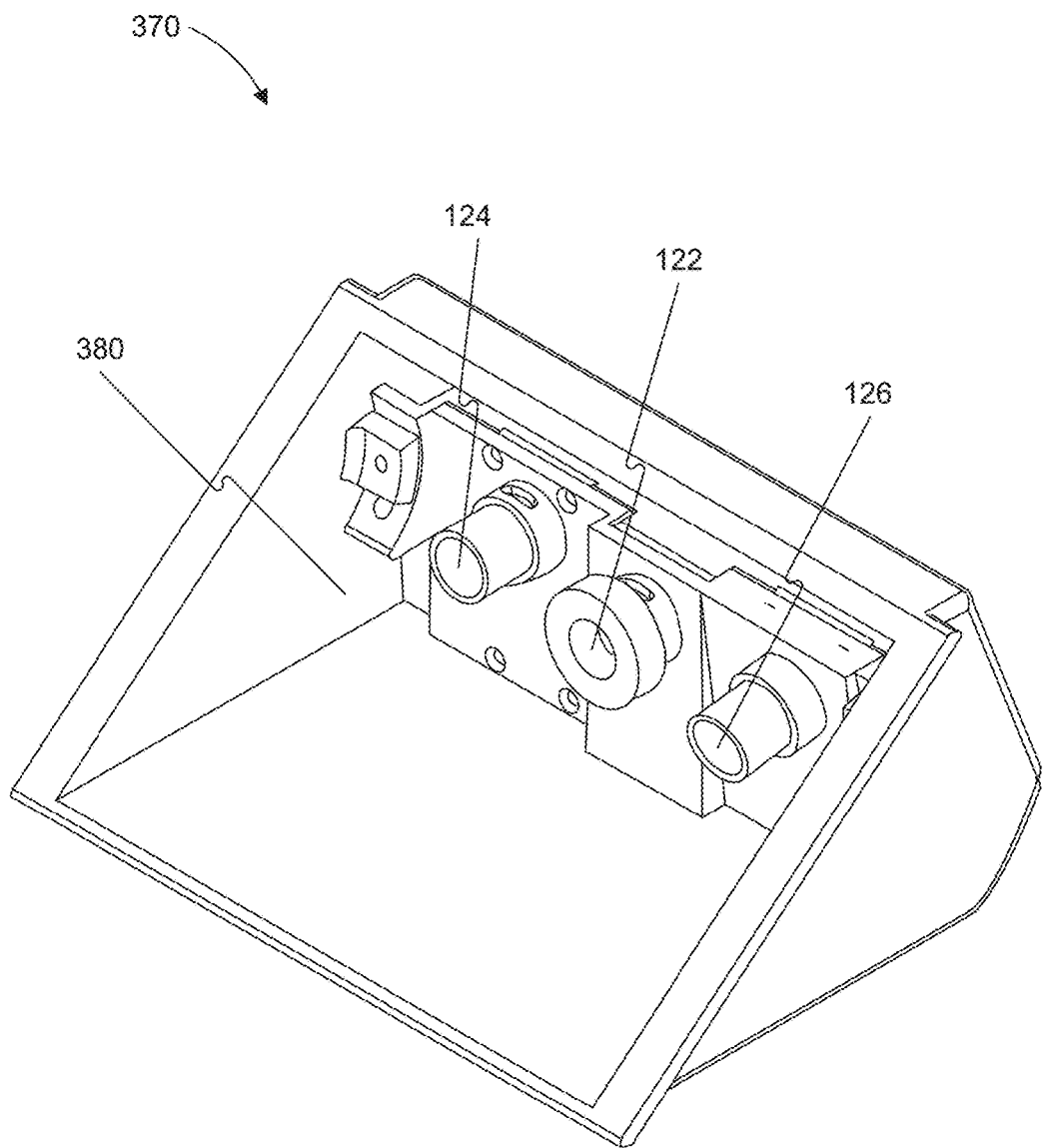
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that it aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). Other camera configurations are consistent with the disclosed embodiments, and the configurations disclosed herein are examples. For example, system 100 may include a configuration of any number of cameras (e.g., one, two, three, four, five, six, seven, eight, etc.) Furthermore, system 100 may include "clusters" of cameras. For example, a cluster of cameras (including any appropriate number of cameras, e.g., one, four, eight, etc.) may be forward-facing relative to a vehicle, or may be facing any other direction (e.g., reward-facing, side-facing, at an angle, etc.) Accordingly, system 100 may include multiple clusters of cameras, with each cluster oriented in a particular direction to capture images from a particular region of a vehicle's environment.

The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122-126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122-126 may be positioned behind rearview mirror 310 and positioned substantially side-by-side (e.g., 6 cm apart). Further, in some embodiments, as discussed above, one or more of image capture devices 122-126 may be mounted behind glare shield 380 that is flush with the windshield of vehicle 200. Such shielding may act to minimize the impact of any reflections from inside the car on image capture devices 122-126.

In another embodiment, as discussed above in connection with FIGS. 3B and 3C, the wide field of view camera (e.g., image capture device 124 in the above example) may be mounted lower than the narrow and main field of view cameras (e.g., image capture devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122-126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from the main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system). Furthermore, in some embodiments, redundancy and validation of received data may be supplemented based on information received from one more sensors (e.g., radar, lidar, acoustic sensors, information received from one or more transceivers outside of a vehicle, etc.).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
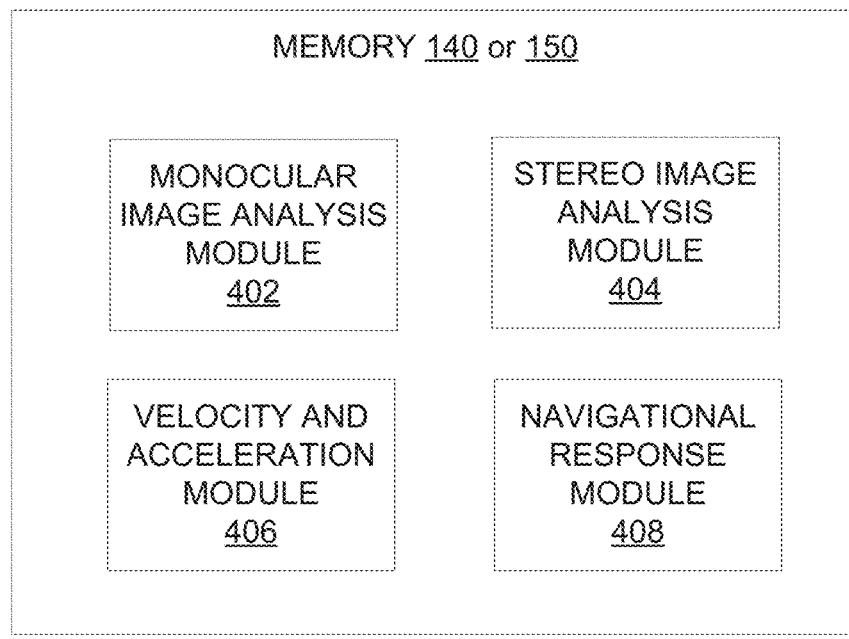
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, applications processor 180 and/or image processor 190 may execute the instructions stored in any of modules 402-408 included in memory 140. One of skill in the art will understand that references in the following discussions to processing unit 110 may refer to applications processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar, lidar, etc.) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with determining a navigational response.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408. Furthermore, in some embodiments, stereo image analysis module 404 may implement techniques associated with a trained system (such as a neural network or a deep neural network) or an untrained system.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Furthermore, any of the modules (e.g., modules 402, 404, and 406) disclosed herein may implement techniques associated with a trained system (such as a neural network or a deep neural network) or an untrained system.

Figure 5A:
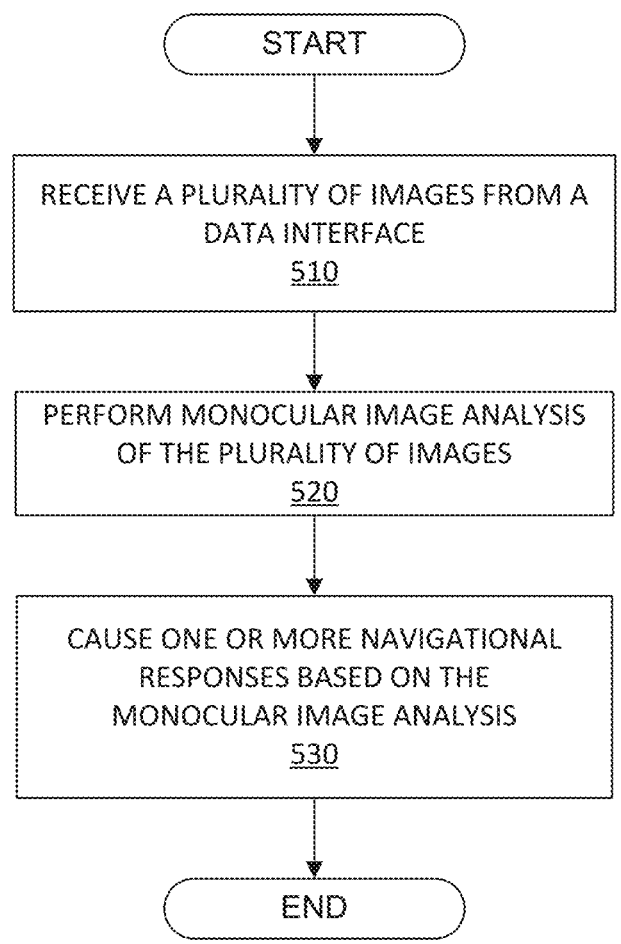
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
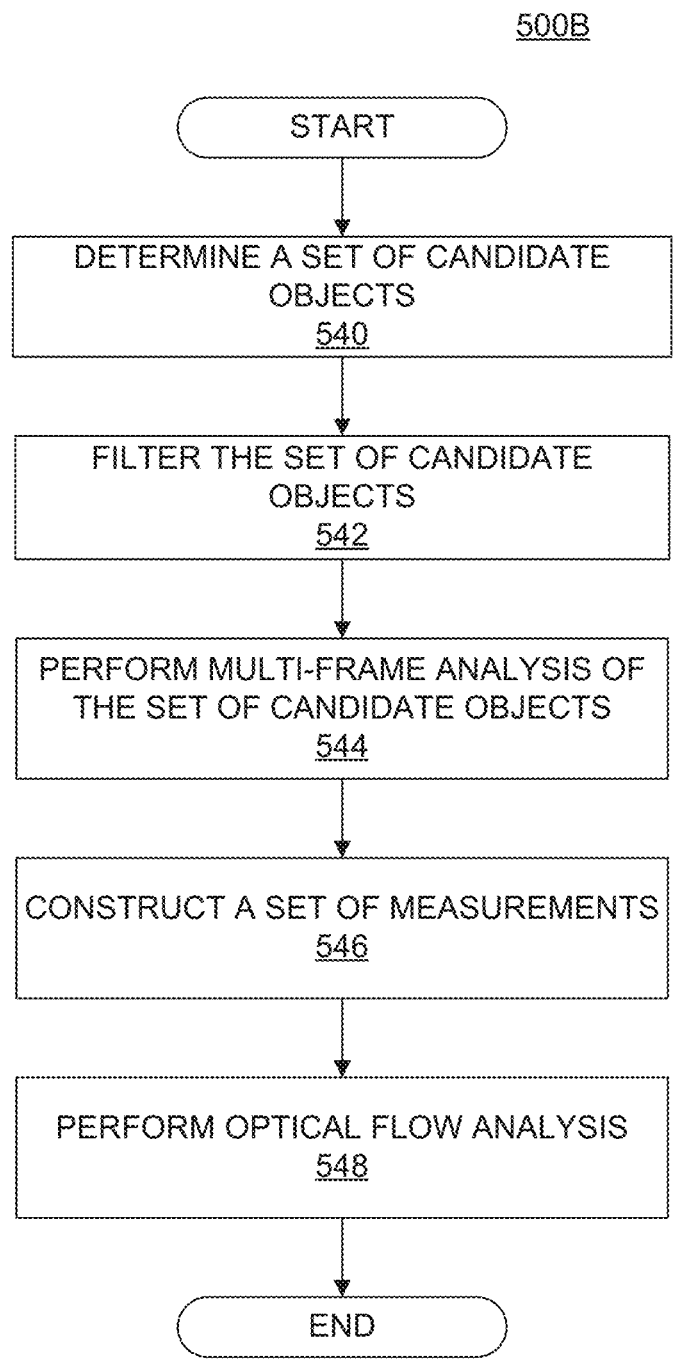
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
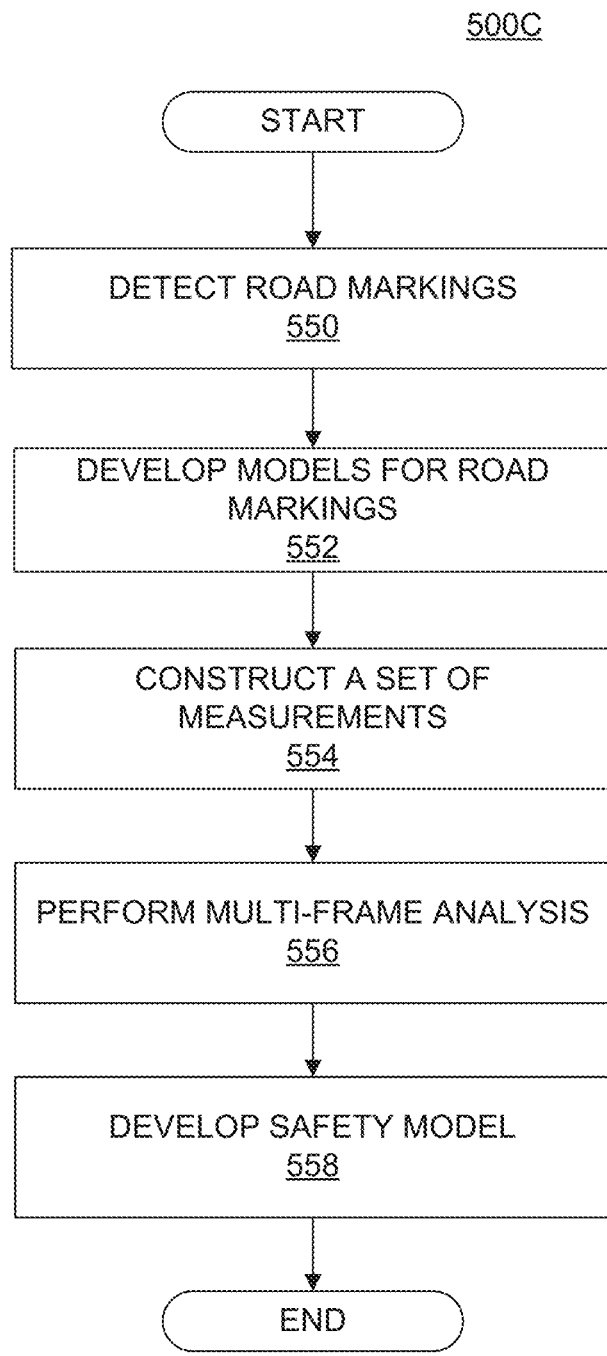
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550-556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
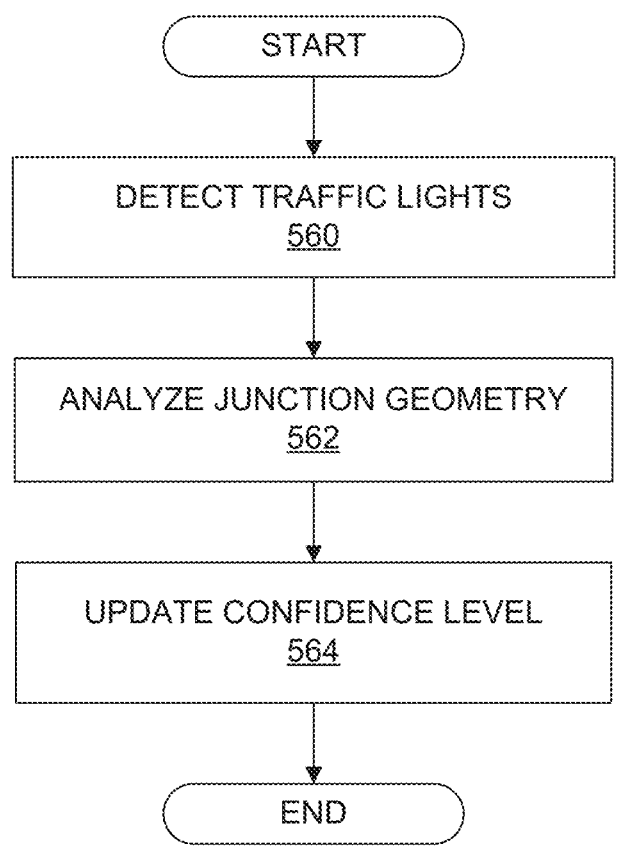
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560-564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
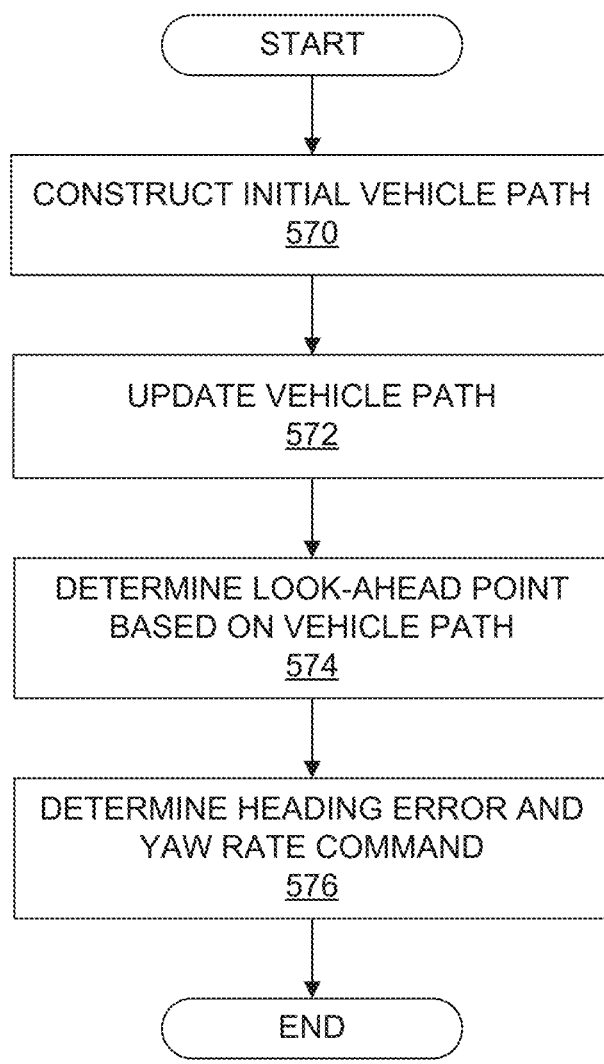
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
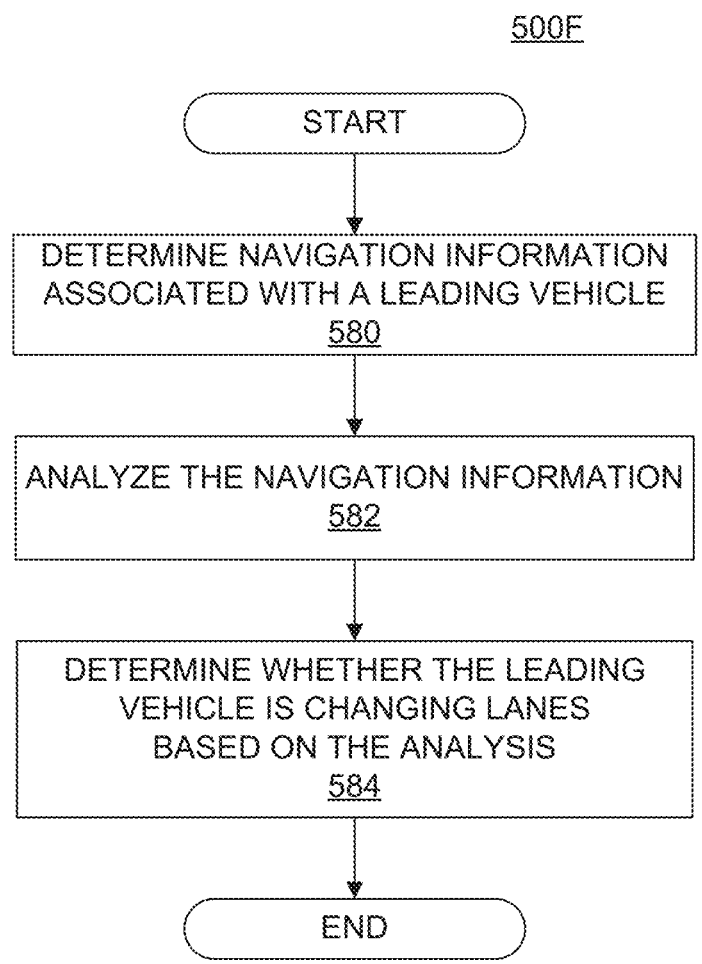
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2 + \delta_x^2)/2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights. Furthermore, in some embodiments, the analysis may make use of trained system (e.g., a machine learning or deep learning system), which may, for example, estimate a future path ahead of a current location of a vehicle based on an image captured at the current location.

Figure 6:
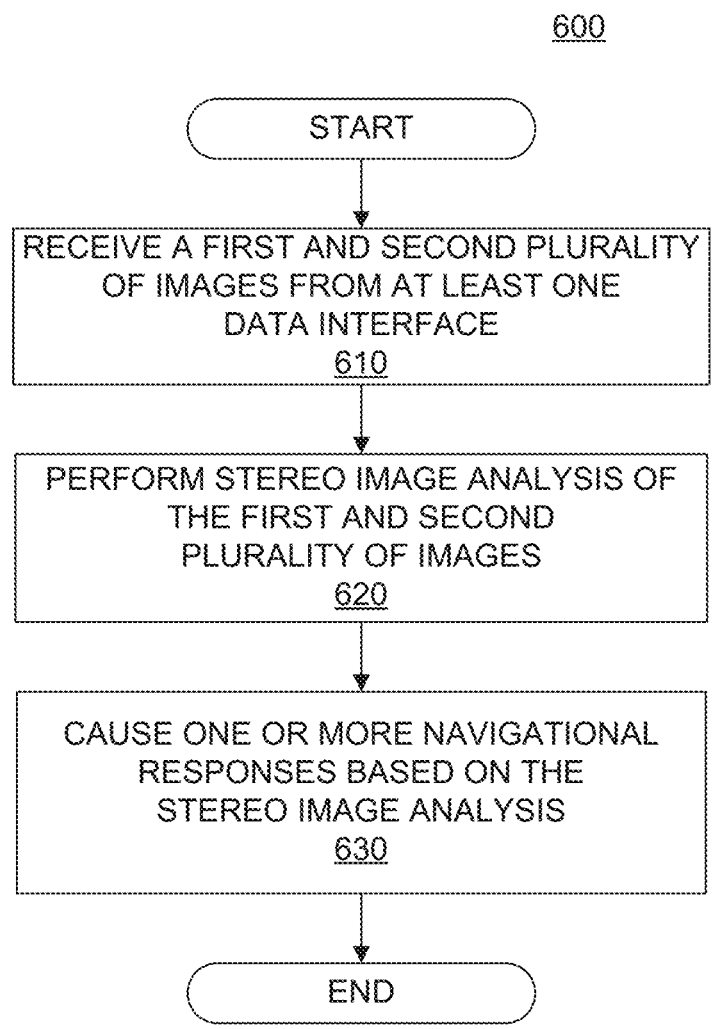
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing in the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
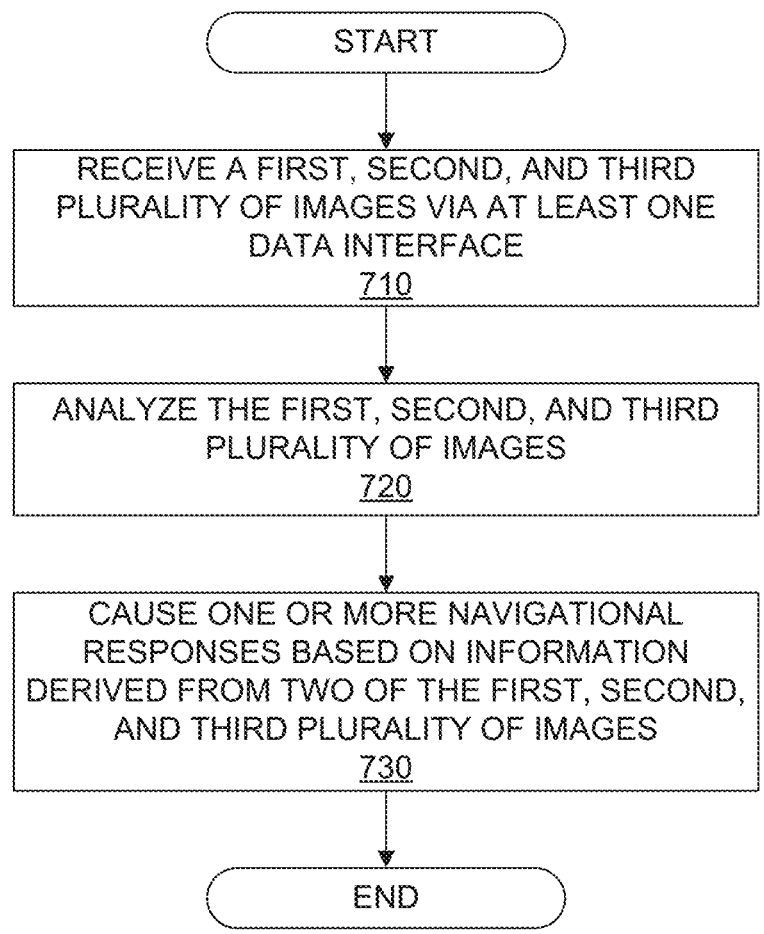
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Navigating a Vehicle Based on a Detected Barrier

Consistent with disclosed embodiments, the system may determine a navigational path of a vehicle based on at least one barrier detected from an image captured by an image capture device. The system may differentiate between traversable barriers (e.g., curb, lane marking, or road edge, etc.) and non-traversable barriers (e.g., concrete barrier, lane dividing structure, other vehicles, tunnel wall, or bridge structure, etc.) In an emergency situation when an obstacle (e.g., a pedestrian, an animal, debris, or other non-road objects) appears forward of the vehicle, the system may determine the navigational path to travel through a traversable barrier in order to avoid an accident.

In addition, the system may also differentiate between movable barriers (e.g., other vehicles, traffic cones, etc.) and fixed barriers (e.g., a road edge, a curb, a lane dividing structure, a tunnel wall, or a bridge structure, etc.) The system may determine a position of a fixed barrier, and transmit to a remote server an update to a map for autonomous vehicle navigation based on the determined position of the fixed barrier.

Figure 8:
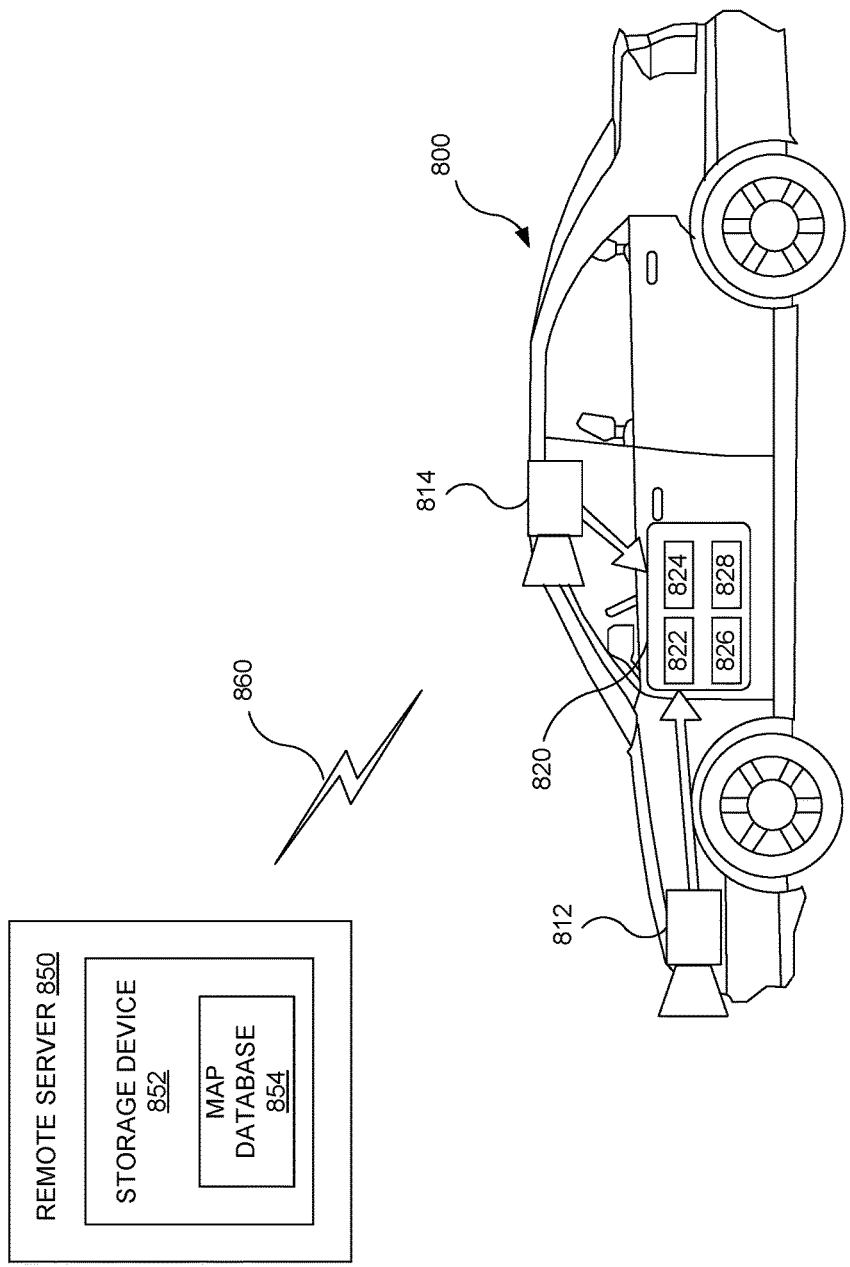
FIG. 8 illustrates a navigation system for a vehicle, consistent with disclosed embodiments.

FIG. 8 illustrates a navigation system for a vehicle, consistent with disclosed embodiments. For illustration, the vehicle is referenced as vehicle 800. The vehicle shown in FIG. 8 may be any other vehicle disclosed herein, including, for example, vehicle 200 shown in other embodiments. As shown in FIG. 8, vehicle 800 may communicate with a remote server 850. Vehicle 800 may include at least one image capture device (e.g., cameras 812 and 814). Vehicle 800 may include a navigation system 820 configured for providing navigation guidance for vehicle 800 to travel on a road. Vehicle 800 may be an autonomous vehicle, and navigation system 820 may be used for providing navigation guidance for autonomous driving. Alternatively, in other embodiments, vehicle 800 may also be a non-autonomous, human-controlled vehicle, and navigation system 820 may still be used for providing navigation guidance.

Navigation system 820 may include a communication unit 822 configured to communicate with server 850 through a communication path 860. Navigation system 820 may include a Global Positioning System (GPS) unit 824 configured to receive and process GPS signals. Navigation system 820 may include at least one processor 826 configured to process data, such as GPS signals, images captured by cameras 812 and 814, and/or map data from server 850. Navigation system 820 may include a memory 828, which may store various modules that, when executed by processor 826, may cause the processor to perform various methods 828 consistent with the embodiments.

Remote server 850 may include a storage device 852 (e.g., a computer-readable medium) provided on remote server 850 that communicates with vehicle 800. Remote server 850 may store a map database 854 in storage device 852. Map database 854 may include maps of certain regions. Vehicle 800 may communicate with remote server 850 to receive data included in map database 854. Vehicle 800 may also communicate with remote server 850 to transmit an update of map data in map database 854.

Figure 9:
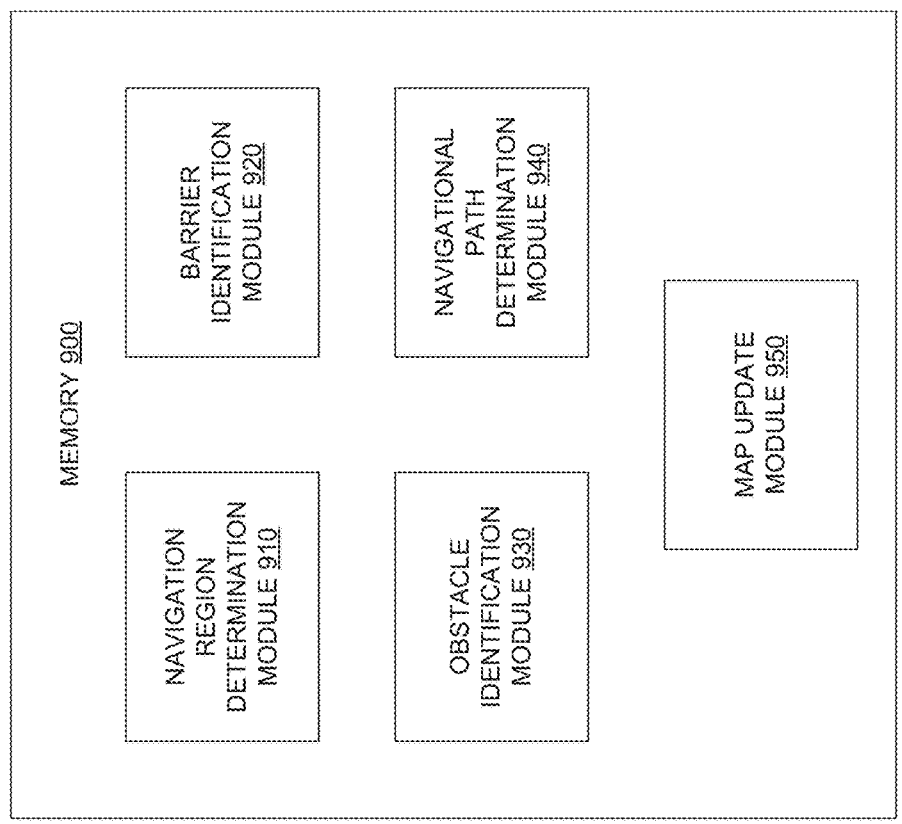
FIG. 9 shows an example of a memory storing program modules, consistent with disclosed embodiments.

FIG. 9 shows an example of memory 900, consistent with disclosed embodiments. Memory 900 may be memory 828 that is included in navigation system 820 of vehicle 800. Memory 900 may include various modules which, when executed by a processor (e.g., processor 826), may cause the processor to perform various methods.

For example, memory 900 may include a navigation region determination module 910. Navigation region determination module 910 may, when executed by a processor, cause the processor to analyze at least one of a plurality of images received from an image capture device (e.g., one of cameras 812 and 814) to identify a navigable region in an environment of a vehicle (e.g., vehicle 800).

Memory 900 may also include a barrier identification module 920. Barrier identification module 920 may cause the processor to analyze the at least one of the plurality of images received from the image capture device and identify, based on the at least one of the plurality of images, at least one barrier associated with an edge of the navigable region. The at least one barrier may include a curb, a lane marking, a road edge, a concrete barrier, a lane dividing structure, a tunnel wall, a bridge structure, etc. The barriers may include a physical object (e.g., a barrier) or a road marking, or any other indication that an area beyond a certain edge is outside the navigable region. In one example, a certain physical object or road marking may be classified as a road barrier under certain circumstances or for certain vehicles, and the same physical object or road marking may be regarded as a "non-barrier" for other vehicles or under different circumstances. One example of such a dynamically shifting barrier may be a lane assignment sign, which at certain hours during the day assigns a lane to traffic running in one direction, but at a different time of the day assigns the lane to traffic running in the opposite direction. The lane marking may be a barrier (preventing vehicles to enter the lane) or an ordinary lane marking depending on the time day and on the direction of the vehicles motion. In another example, a lane marking may be a barrier for vehicles in which less than a certain number of people is travelling and, at the same time, the same lane marking may be an ordinary lane marking for vehicles with more than a certain number of people or for public transportation.

Barrier identification module 920 may also cause the processor to determine a type of the at least one barrier. The type of barrier may be traversable or non-traversable. Traversable barriers may include barriers that can be traversed by a vehicle without causing any substantial damage to the vehicle, the barriers, or any other objects close to the barriers and located on the opposite side of the barriers. Examples of the traversable barriers may include curbs, lane markings, road edges, etc. Non-traversable barriers may include barriers that cannot be traversed by the vehicle, i.e., may cause major damage to the vehicle, the barriers, or any other objects close to the barriers. Examples of the non-traversable barriers may include concrete barriers, lane dividing structures, other vehicles, tunnel walls, or bridge structures, etc.

Barrier identification module 920 may also be adapted to classify the area beyond the at least one barrier, specifically when the at least one barrier is a traversable barrier. For example, in case pedestrians are detected beyond a shallow sidewalk curb (which can be regarded as traversable), the barrier identification module 920 may classify the area beyond the at least one barrier as hazardous, or as potentially including pedestrians.

In some embodiments, the type of barrier may be movable or fixed. Movable barriers may include barriers whose positions are varying and not fixed. Examples of the movable barriers may include other vehicles, traffic cones, fallen trees, or the dynamically shifting barrier discussed above, etc. Fixed barriers may include barriers that are part of a road or a road environment. Examples of the fixed barriers may include road edges, curbs, lane dividing structures, tunnel walls, or bridge structures.

Memory 900 may also include an obstacle identification module 930. Obstacle identification module 930 may cause the processor to analyze the at least one of the plurality of images received from the image capture device and identify, based on the analysis of at least one of the plurality of images, an obstacle forward of the vehicle. The obstacle may be a non-road object, i.e., an object that does not belong to the road. For example, the obstacle may be a pedestrian, an animal, debris (e.g., tree, lamppost, etc.). The obstacle may be located in a position forward of and close to the vehicle. The obstacle may be located in a previously determined navigational path of the vehicle, such that, if the vehicle does not steer away from the navigational path, the vehicle might collide with the obstacle to cause a traffic accident. In some other examples, obstacle identification module 930 may cause the processor to analyze information from radar or lidar to identify an obstacle forward of the vehicle.

Memory 900 may further include a navigational path determination module 940. Navigational path determination module 940 may cause the processor to determine a navigational path of the vehicle based on the type of the at least one barrier. For example, the processor may analyze a destination location, a current location of the vehicle, and determine the navigational path leading the vehicle to the destination. The navigational path may be located in a navigable region partially surrounded by traversable or non-traversable barriers. When the processor identifies an obstacle forward of and close to the vehicle, the processor may determine the navigational path to avoid the identified obstacle. If the identified obstacle is unavoidable, the processor may determine the navigational path to travel through a traversable barrier. In another example, if the identified obstacle is unavoidable, the processor may process sensor data relating to the area beyond the barrier to determine whether or not it is safe to cross the traversable barrier, and may possibly also compute a safe or even the safest path which include at least an area that is beyond the traversable barrier.

Memory 900 may further include a map update module 950. Map update module 950 may cause the processor to determine whether to transmit to a remote server (e.g., remote server 850) an update to a map (e.g., map database 854) based on the determined type of the barrier. When the determined type of the barrier is movable, the processor may determine not to transmit an update. Otherwise, when the determined type of the barrier is fixed, the processor may determine to transmit a map update related to the fixed barrier to the remote processor. The map update may include a position, shape, size, and/or identifier of the fixed barrier, and possibly also data about the area beyond the barrier (for example, whether or not a hazard, such as pedestrians, for example, was identified in the area beyond the barrier).

Figure 10A:
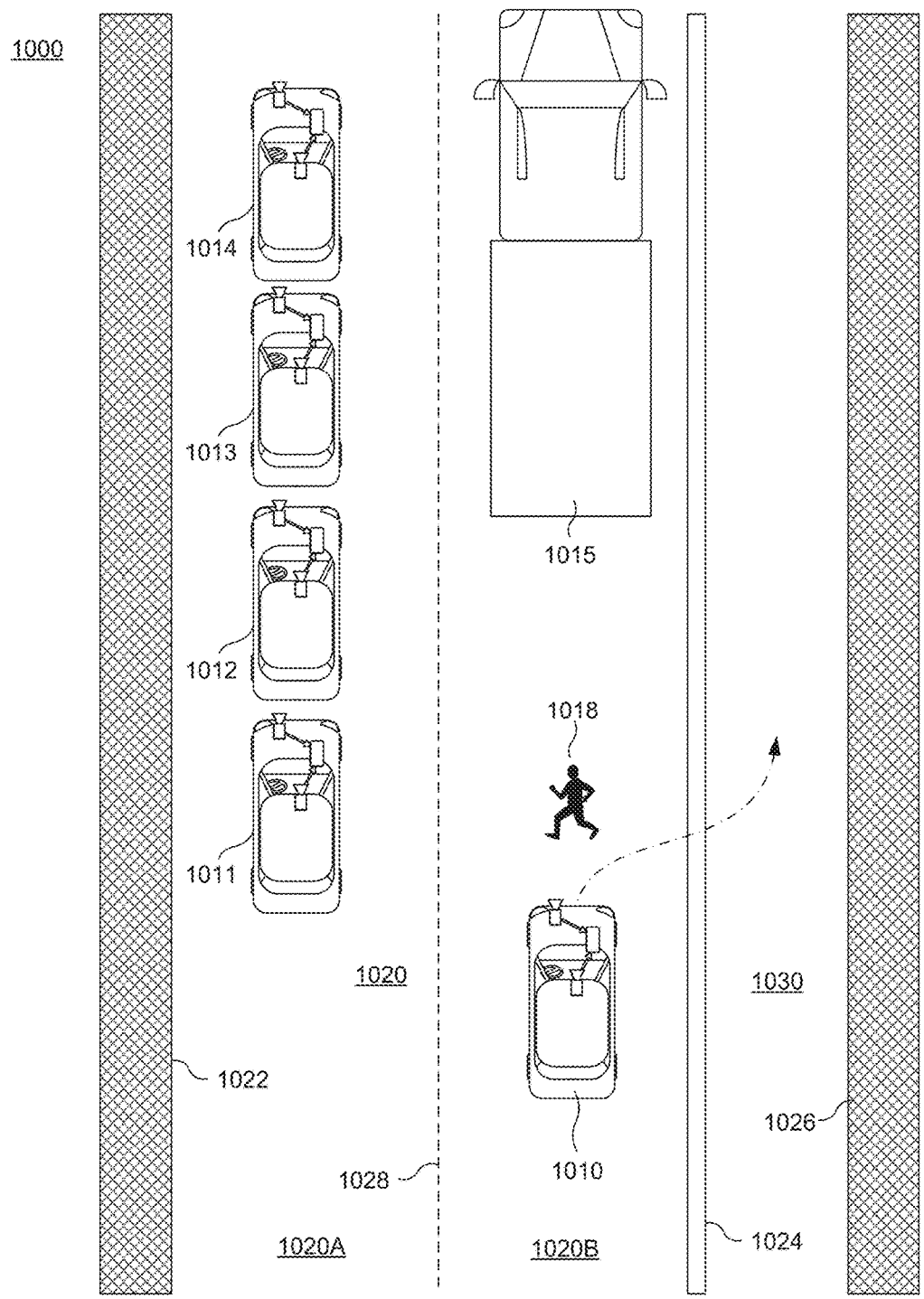
FIG. 10A schematically illustrates a bird's eye view of an environment of an exemplary vehicle consistent with disclosed embodiments.

FIG. 10A schematically illustrates a bird's eye view of an environment 1000 of an exemplary vehicle 1010 consistent with disclosed embodiments. The exemplary vehicle 1010 may be, for example, vehicle 800 described above in reference to FIG. 8 and may include a navigation system, such as navigation system 820 of vehicle 800.

As shown in FIG. 10A, environment 1000 of vehicle 1010 includes a road area 1020 defined by a concrete barrier 1022 and a curb 1024, and a non-road area 1030 defined by curb 1024 and a concrete barrier 1026. Road area 1020 includes a left lane 1020A and a right lane 1020B divided by a lane marking 1028. Vehicle 1010 is traveling on right lane 1020B. Another vehicle (e.g., a truck) 1015 is traveling on right lane 1020B forward of vehicle 1010. A plurality of vehicles 1011, 1012, 1013, and 1014 are traveling on left lane 1020A. A pedestrian 1018 is walking on right lane 1020B.

Figure 10B:
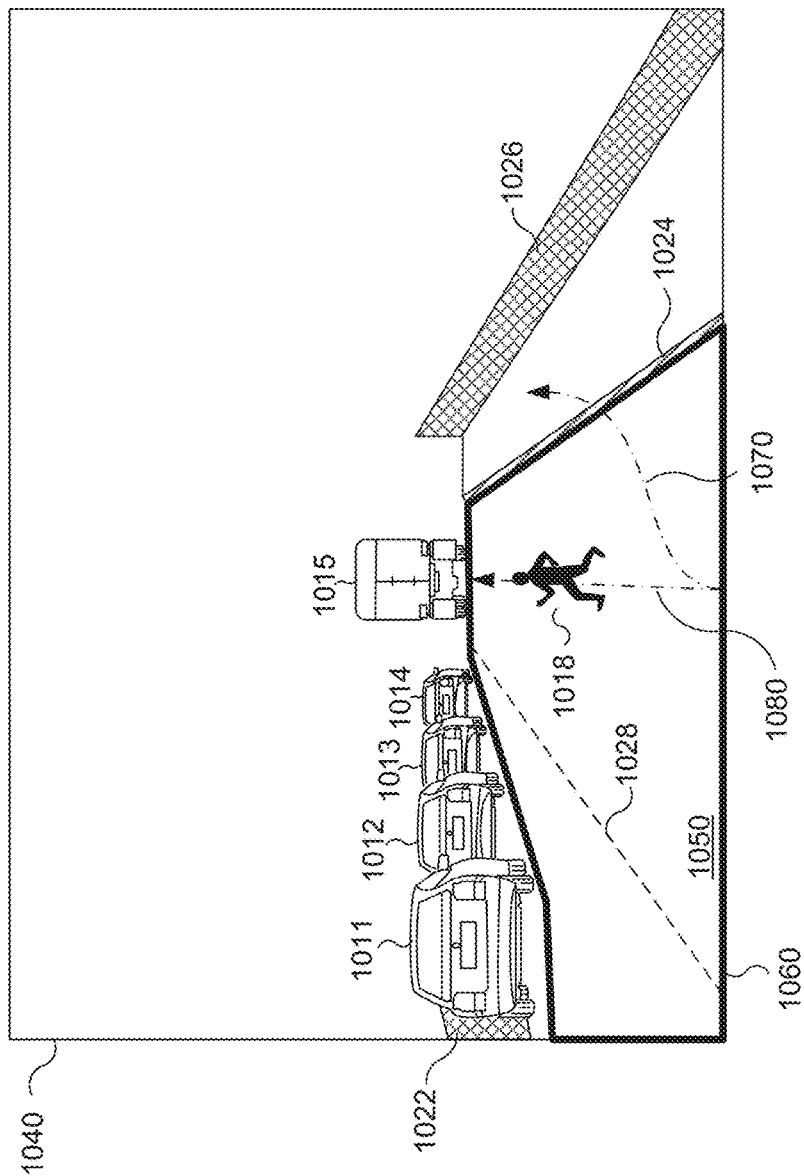
FIG. 10B schematically illustrates an image of the environment of FIG. 10A captured by a forward facing image capture device included in the exemplary vehicle shown in FIG. 10A.

FIG. 10B schematically illustrates an image 1040 of environment 1000 captured by a forward facing image capture device on exemplary vehicle 1010. The forward facing image capture device may be, for example, one of cameras 812 and 814 of vehicle 800. A processor (e.g., processor 826 included in navigation system 820 of vehicle 800) may analyze image 1040 to determine a navigable region 1050 with an edge 1060. Edge 1060 may be disposed along sides of vehicles 1011-1014 close to vehicle 1010 (i.e., viewer of image 1040), a rear side of vehicle 1015, and curb 1024. Barriers (e.g., vehicles 1011-1015 and curb 1024) associated with at least one portion of edge 1060 may be used to determine a navigational path 1070 for vehicle 1010.

Figure 11:
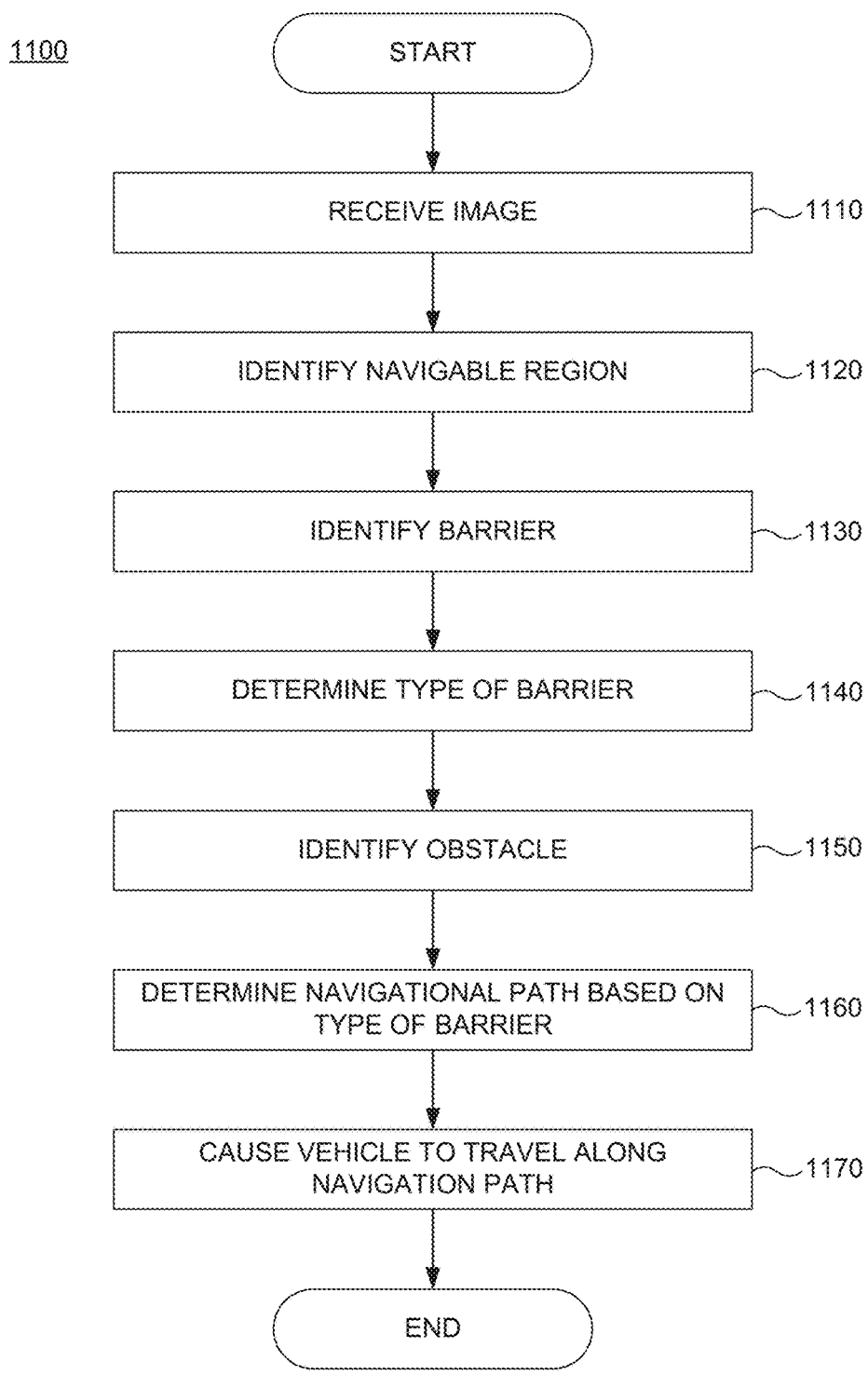
FIG. 11 is a flowchart showing an exemplary process consistent with disclosed embodiments.

FIG. 11 is a flowchart showing an exemplary process 1100 for navigating a vehicle based on detected barriers, consistent with disclosed embodiments. Process 1100 may be performed by a processor (e.g., processor 826) onboard of a vehicle (e.g., vehicle 800). Process 1100 may analyze at least one image taken by a forward facing image capture device (e.g., one of cameras 812 and 814) to determine a navigational path for the vehicle.

At step 1110, processor 826 may receive, from an image capture device, a plurality of images associated with an environment of vehicle 800. Image 1040 shown in FIG. 10B is an example of an image of environment 1000 of vehicle 800 that may be received from an image capture device (e.g., one of cameras 812 and 814) on vehicle 800. In some embodiments, the plurality of images may be captured at different times by the image capture device (e.g., images may be captured apart by less than a second, 1 second, 2 second, etc.). In some embodiments, vehicle 800 may include a plurality of image capture devices (e.g., cameras 812 and 814), and processor 826 may receive from each image capture device, a plurality of images associated with environment 1000 of vehicle 800. The plurality of images received from each image capture device may be images captured at different times by each image capture device.

At step 1120, processor 826 may analyze at least one of the plurality of images received from the image capture device. In embodiments where a single plurality of images is generated based on images received from a plurality of image capture devices, processor 826 may analyze at least one image of the single plurality of images. Alternatively, each image received from each image capture device may be analyzed independently.

Processor 826 may also identify, based on the analysis of the at least one of the plurality of images, a navigable region in the environment of vehicle 800. For example, processor 826 may identify, based on image 1040, a navigable region 1050 with an edge 1060.

In one embodiment, processor 826 may determine the navigable region by using Convolutional Neural Networks (CNN). For example, processor 826 may be trained by using a plurality of training images that were manually labeled with free space pixels and non-free space pixels. As a result of the training, processor 826 may label the pixels in image 1040 as free space pixels and non-free space pixels. Processor 826 may then determine a boundary between the free space pixels and non-free space pixels. Processor 826 may identify a region surrounded, or partially surrounded, by the boundary as the navigable region.

At step 1130, processor 826 may identify at least one barrier associated with an edge of the navigable region. The at least one barrier may include curb, lane marking, road edge, concrete barrier, lane dividing structure, tunnel wall, or bridge structure, etc. For example, processor 826 may identify vehicles 1011-1015 and curb 1024 as barriers associated with associated with edge 1060 of navigable region 1050.

In one embodiment, a memory (e.g., memory 828) may store a plurality of training images of various barriers. Processor 826 may compare image 1040 with the plurality of training images to identify objects in image 1040 that have at least one feature (e.g., shape, color, etc.) that match the features of the barriers in the training images. Processor 826 may determine the identified objects as the barriers.

In some embodiments, each of the barriers in the training images may be associated with a barrier identifier. Examples of barrier identifiers may include "vehicle," "lane marking," "road edge," "concrete barrier," "lane dividing structure," "tunnel wall," or "bridge structure," etc. When processor 826 identifies an object that matches a barrier in the training images, processor 826 may label the identified object with the barrier identifier associated with the matching barrier.

At step 1140, processor 826 may determine a type of the at least one barrier that was identified at step 1130. The type of barriers may be traversable or non-traversable. Examples of the traversable barriers may include curbs, lane markings, or road edges, etc. Examples of the non-traversable barriers may include concrete barriers, lane dividing structures, other vehicles, tunnel walls, or bridge structures, etc. In image 1040 shown in FIG. 10B, processor 826 may identify vehicles 1011-1015 as non-traversable barriers, and may identify curb 1024 as a traversable barrier. The type of barriers may also be movable or fixed. Examples of the movable barriers may include other vehicles, traffic cones, fallen trees, etc. Examples of fixed barriers may include road edges, curbs, lane dividing structures, tunnel walls, or bridge structures. In image 1040 shown in FIG. 10B, processor 826 may identify vehicles 1011-1015 as movable barriers, and may identify curb 1024 as a fixed barrier.

In one embodiment, a memory (e.g., memory 828 of vehicle 800) may store a database including a plurality of barrier identifiers each corresponding to one or more barrier types. When processor 826 identifies a barrier in an image and labels the barrier with a barrier identifier, processor 826 may refer to the database to identify one or more barrier types that correspond to the barrier identifier. The identified barrier types may be considered by processor 825 as the barrier type of the barrier identified in the image.

In another embodiment for determining a barrier type, processor 826 may be trained by a plurality of training images that were manually labeled with free space pixels, non-free space pixels, and various types of barrier pixels that respectively correspond to various barriers. As a result of training by using these training images, processor 826 may label the pixels in image 1040 as free space pixels, non-free space pixels, and various types of barrier pixels. Signatures that were generated by other types of sensors, such as LiDar, Radar or Ultrasonic sensors, can also be used for training the processor 826, and the trained processor 826 may be enabled, based on inputs from corresponding sensing units, to label free space pixels, non-free space pixels, and various types of barrier pixels. The data from different types of sensors may be fused and the sensor 826 can be configured to label free space pixels, non-free space pixels, and various types of barrier pixels based on inputs from different types of sensors.

At step 1150, processor 826 may identify, based on the analysis of the at least one image, an obstacle forward of vehicle 800. The obstacle may be a non-road object, i.e., an object that does not belong to the road. The obstacle may be located in a position forward of and close to the vehicle. For example, the obstacle may be a pedestrian, an animal, a fallen object (e.g., tree, lamppost, etc.). In image 1040, processor 826 may identify pedestrian 1018 as an obstacle.

In one embodiment, a memory (e.g., memory 828) may store a plurality of training images of various obstacles. Processor 826 may compare image 1040 with the plurality of training images to identify an object in image 1040 that has at least one feature (e.g., shape, color, etc.) that matches a feature of an obstacle in the training images. Processor 826 may determine the identified objects as the obstacle. Alternatively, the plurality of training images of various obstacles may be used to create a trained system, such as a neural network or a deep neural network for example, and the trained system may be used by the processor 826 to detect an obstacle in the image 1040 or to determine if an object in the image 1040 is an obstacle, and possibly also what type of obstacle it is.

Processor 826 may also determine, based on the analysis of the at least one image, a position of the obstacle relative to the vehicle. For example, processor 826 may determine the position of the obstacle based on a size of the obstacle as it appears in the image 1040, a typical size of that type of obstacle, and/or a relative position between the obstacle and the barriers along the road.

Processor 826 may further determine, based on the position of the obstacle, whether the obstacle is located in a previously determined navigational path of the vehicle and whether, if the vehicle does not steer away from the previously determined navigational path, the vehicle might collide with the obstacle to cause a traffic accident. In the example of FIG. 10B, pedestrian 1018 is located at a previously determined navigational path 1080, and the distance between pedestrian 1018 and vehicle 1010 is less than a threshold distance value such that vehicle 1010 might hit pedestrian if it does not steer away from the previously determined navigational path 1080.

At step 1160, processor 826 may determine a navigational path of the vehicle based on the identified obstacle and the determined type of the obstacle. For example, processor 826 may determine a navigational path through the navigable region to avoid the obstacle. If such a navigational path is not available through the navigable region, processor 826 may analyze the type of the barrier associated with the edge of the navigable region. If the barrier is traversable, processor 826 may determine the navigational path to travel through the traversable barrier. In the example of FIG. 10B, processor 826 may determine a new navigational path 1070 that travels over curb 1024, which is a traversable barrier, in order to avoid pedestrian 1018.

At step 1170, processor 826 may cause the vehicle to travel on at least a portion of the determined navigational path. In some embodiments, processor 826 may cause one or more navigational responses in vehicle 800 to navigate along the determined navigational path. Navigational responses may include, for example, a turn, a lane shift, a change in acceleration, and the like. Additionally, multiple navigational responses may occur simultaneously, in sequence, or any combination thereof to navigate along the determined navigational path. For instance, processor 826 may cause vehicle 800 to move laterally and then accelerate by, for example, sequentially transmitting control signals to a steering system (e.g., steering system 240) and a throttling system (e.g., throttling system 220). Alternatively, processor 826 may cause vehicle 800 to brake while at the same time moving laterally, for example, simultaneously transmitting control signals to a braking system (e.g., braking system 230) and a steering system (e.g., steering system 240).

Figure 12:
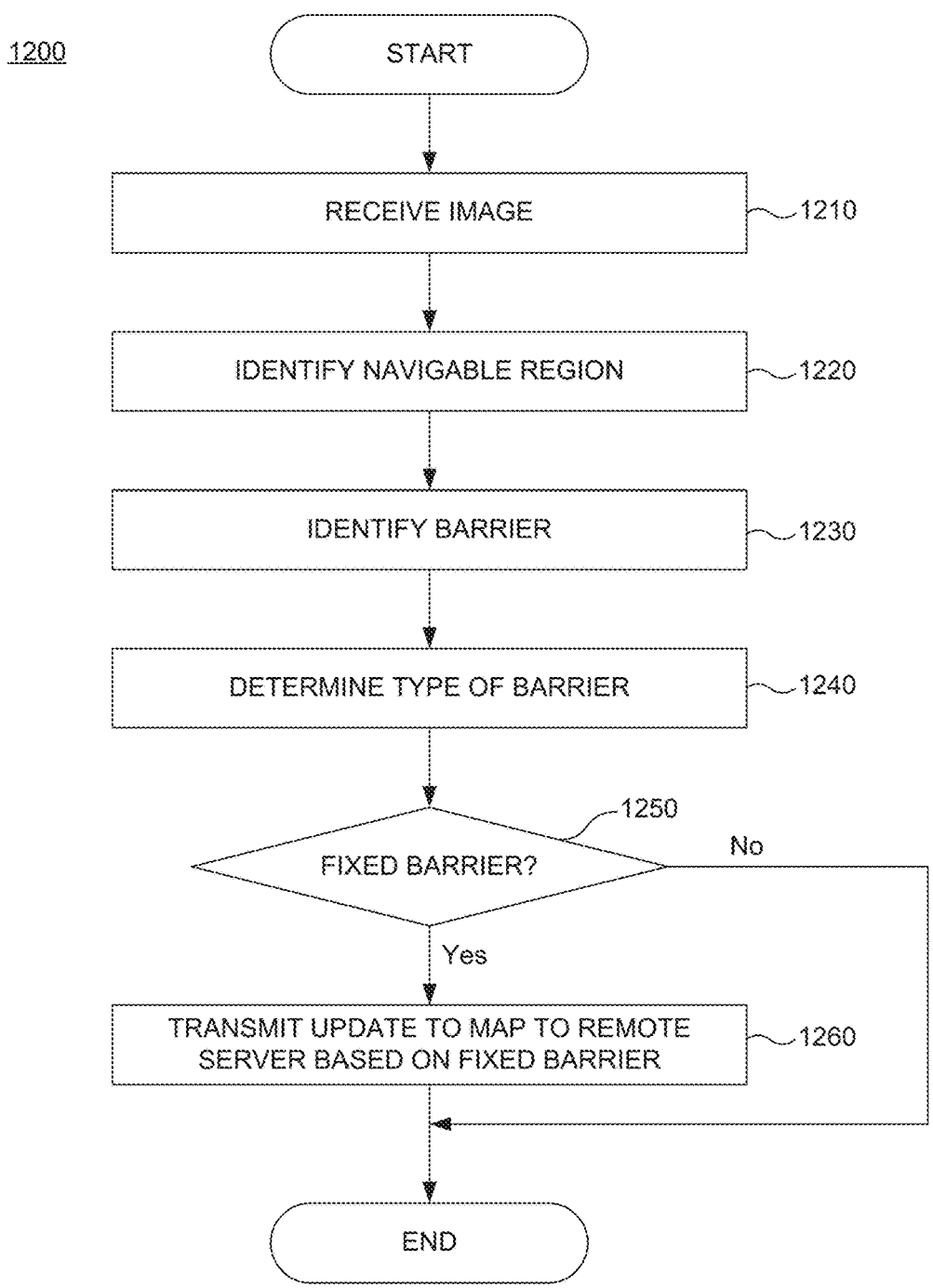
FIG. 12 is a flowchart showing an exemplary process consistent with disclosed embodiments.

FIG. 12 is a flowchart showing an exemplary process 1200, consistent with disclosed embodiments. Process 1200 may be performed by a processor (e.g., processor 826) onboard of a vehicle (e.g., vehicle 800). Process 1100 may analyze at least one image taken by a forward facing image capture device (e.g., one of cameras 812 and 814) to obtain information for updating a map.

At step 1210, processor 826 may receive, from an image capture device, a plurality of images associated with an environment of vehicle 800. At step 1220, processor 826 may analyze at least one of the plurality of images received from the image capture device to identify a navigable region in the environment of vehicle 800. At step 1230, processor 826 may identify at least one barrier associated with an edge of the navigable region. At step 1240, processor 826 may determine a type of the at least one barrier. Steps 1210 through 1240 are substantially the same as steps 1110 through 1140 of process 1100. Therefore, detailed description of steps 1210 through 1240 are not repeated here.

After determining the type of the at least one barrier, processor 826 may transmit to a remote server (e.g., server 850) an update to a map in a map database (e.g., map database 854) for autonomous vehicle navigation based on the determined type of barrier. Specifically, at step 1250, processor 826 may determine whether the barrier is fixed. As discussed above, fixed barriers may include barriers that are part of a road or road environment. Examples of fixed barriers may include road edges, curbs, lane dividing structures, tunnel walls, or bridge structures. In the example of FIG. 10B, processor 826 may determine curb 1024 as a fixed barrier.

If the barrier is fixed (step 1250: Yes), then, at step 1260, processor 826 may transmit to the remote server an update to a map (i.e., map update) related to the fixed barrier. The map update may include a barrier identifier, a barrier type, and a location of the fixed barrier.

For example, processor 826 may use the following method to determine the location of the fixed barrier. First, processor 826 may acquire a location of vehicle 800 based on GPS data received by a GPS unit (e.g., GPS unit 824). Processor 826 may also analyze the at least one image to determine a relative location of the fixed barrier with respect to vehicle 800. Processor 826 may then determine the location of the fixed barrier based on the location of vehicle 800 and the relative location of the fixed barrier with respect to vehicle 800.

If the barrier is movable (step 1250: No), processor 826 may decide not to update the map. Instead, processor 826 may finish process 1200. Once the map is updated, the map may be used by a navigation system on vehicle 800 or other vehicle for autonomous navigation.

Figure 13:
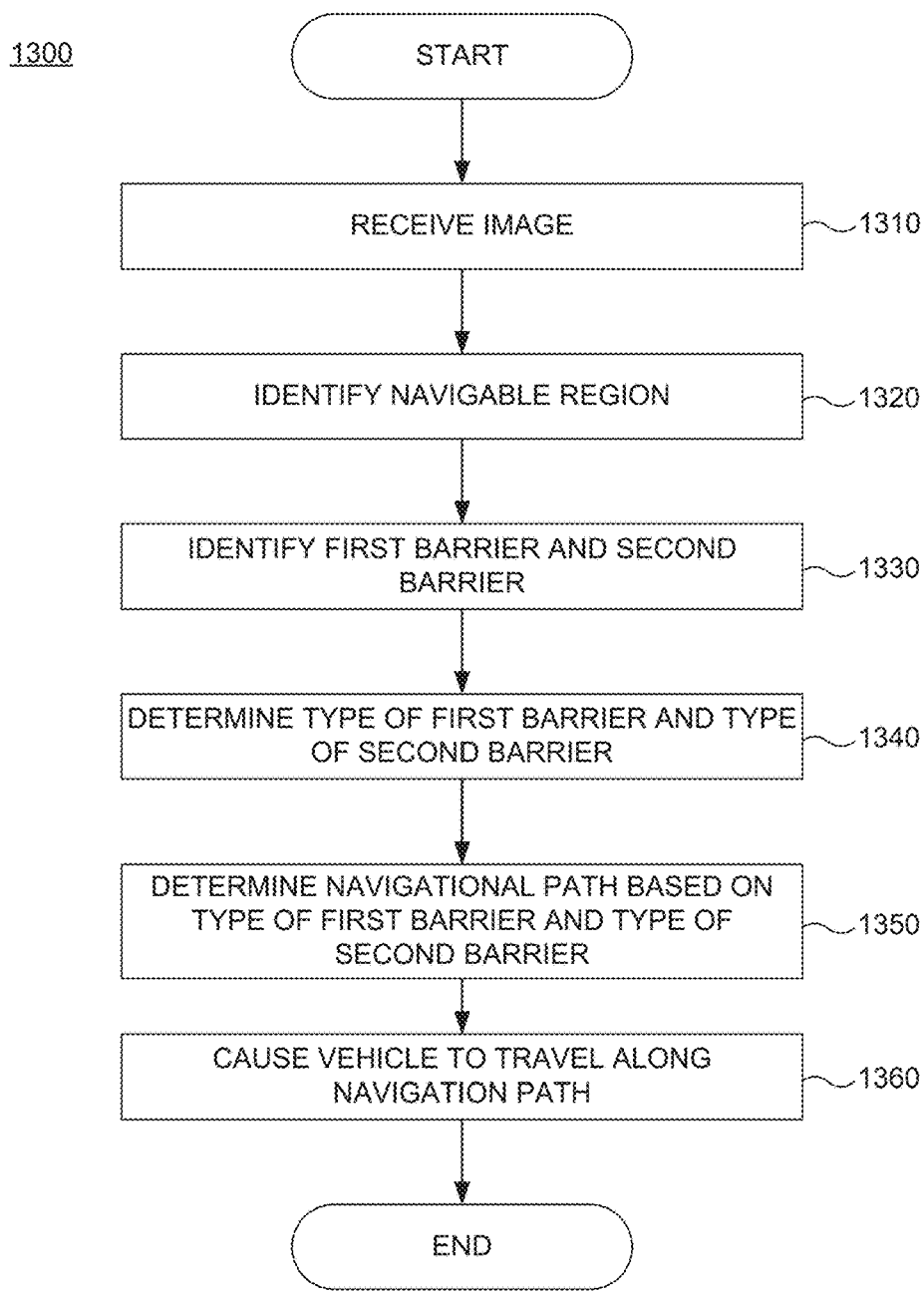
FIG. 13 is a flowchart showing an exemplary process consistent with disclosed embodiments.

FIG. 13 is a flowchart showing an exemplary process 1300 for navigating a vehicle based on detected barriers, consistent with disclosed embodiments. Process 1300 may be performed by a processor (e.g., processor 826) onboard of a vehicle (e.g., vehicle 800). Process 1300 may analyze at least one image taken by a forward facing image capture device (e.g., one of cameras 812 and 814) to determine a navigational path for the vehicle.

At step 1310, processor 826 may receive, from an image capture device, a plurality of images associated with an environment of vehicle 800. At step 1320, processor 826 may analyze at least one of the plurality of images received from the image capture device. Steps 1310 and 1320 are substantially the same as steps 1110 and 1120 of process 1100. Therefore, detailed description of steps 1310 and 1320 are not repeated here.

At step 1330, processor 826 may identify a first barrier associated with a first portion of an edge of the navigable region and a second barrier associated with a second portion of the edge of the navigable region. The first barrier may be a road edge or a curb. The second barrier may be a lane dividing structure, another vehicle, a tunnel wall, or a bridge structure. In the example of FIG. 10B, processor 826 may identify curb 1024 associated with a right-side portion of edge 1060 of navigable region 1050 as the first barrier. Processor 826 may identify vehicle 1015 associated with a forward-side portion of edge 1060 as the second barrier.

At step 1340, processor 826 may determine a type of the first barrier and a type of the second barrier. In the example of FIG. 10B, processor 826 may identify curb 1024 as a traversable barrier, and vehicle 1015 as a non-traversable barrier.

At step 1350, processor 826 may determine a navigational path of the vehicle based on the type of the first barrier and the type of the second barrier. In the example of FIG. 10B, processor 826 may determine navigational path 1070 that travels over curb 1024, which is traversable, in order to avoid vehicle 1015, which is non-traversable.

At step 1360, processor 826 may cause the vehicle to travel on at least a portion of the determined navigational path. In the example of FIG. 10B, processor 826 may cause vehicle 1010 to travel on at least a portion of navigational path 1070.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for navigating a vehicle, the system comprising:
   at least one processing device programmed to:
   receive, from an image capture device, a plurality of images associated with an environment of the vehicle;
   analyze at least one of the plurality of images to identify a navigable region in the environment of the vehicle;
   identify, based on the at least one of the plurality of images, at least one barrier associated with an edge of the navigable region;
   determine a type of the at least one barrier;
   determine a navigational path of the vehicle based on the determined type of the at least one barrier; and
   cause the vehicle to travel on at least a portion of the determined navigational path.

2. The system of claim 1, wherein the at least one processing device is further programmed to identify, based on analysis of at least one of the plurality of images, an obstacle forward of the vehicle, and the determined navigational path of the vehicle avoids the identified obstacle.

3. The system of claim 2, wherein the obstacle includes a pedestrian.

4. The system of claim 2, wherein the obstacle includes another vehicle.

5. The system of claim 2, wherein the determined type of the barrier includes a traversable barrier, and the determined navigational path includes traveling through at least a portion of the traversable barrier.

6. The system of claim 5, wherein the traversable barrier includes a curb or a lane marking.

7. The system of claim 1, wherein the at least one processing device is further programmed to determine whether to transmit to a remote server an update to a map for autonomous vehicle navigation based on the determined type of the barrier.

8. The system of claim 7, wherein the determined type of the barrier includes a fixed barrier, and the at least one processing device is further programmed to transmit a location of the fixed barrier to the remote server.

9. The system of claim 8, wherein the fixed barrier includes at least one of a road edge, a curb, a lane dividing structure, a tunnel wall, or a bridge structure.

10. A system for navigating a vehicle, the system comprising:
    at least one processing device programmed to:
    receive, from an image capture device, a plurality of images associated with an environment of the vehicle;
    analyze at least one of the plurality of images to identify a navigable region in the environment of the vehicle;
    identify, based on the at least one of the plurality of images, a first barrier associated with at least one edge of the navigable region and a second barrier associated with at least one edge of the navigable region;
    determine a type of the first barrier and a type of the second barrier, wherein the determined type of the first barrier includes a traversable barrier and the determined type of the second barrier includes a non-traversable barrier;
    determine a navigational path of the vehicle based on the determined types of the first barrier and the second barrier, wherein the determined navigational path includes traveling through the first barrier in order to avoid the second barrier; and
    cause the vehicle to travel on at least a portion of the determined navigational path.

11. The system of claim 10, wherein the first barrier includes a road edge or a curb.

12. The system of claim 10, wherein the second barrier includes a lane dividing structure, another vehicle, a tunnel wall, or a bridge structure.

13. A method for navigating a vehicle, the method comprising:
receiving, from an image capture device, a plurality of images associated with an environment of the vehicle;
analyzing at least one of the plurality of images to identify a navigable region in the environment of the vehicle;
identifying based on the at least one of the plurality of images, at least one barrier associated with an edge of the navigable region;
determining a type of the at least one barrier;
determining a navigational path of the vehicle based on the determined type of the at least one barrier; and
causing the vehicle to travel on at least a portion of the determined navigational path.

14. The method of claim 13, further comprising:
identifying, based on analysis of at least one of the plurality of images, an obstacle forward of the vehicle, wherein the determined navigational path of the vehicle avoids the identified obstacle.

15. The method of claim 13, wherein the detected type of the barrier includes a traversable barrier, and the determined navigational path includes traveling through at least a portion of the traversable barrier.

16. The method of claim 13, further comprising:
determining whether to transmit to a remote server an update to a map for autonomous vehicle navigation based on the detected type of the barrier.

17. The method of claim 16, wherein the detected type of the barrier includes a fixed barrier, and
the method further comprises transmitting a location of the fixed barrier to the remote server.

18. A method for navigating a vehicle, the method comprising:
receiving, from an image capture device, a plurality of images associated with an environment of the vehicle;
analyzing at least one of the plurality of images to identify a navigable region in the environment of the vehicle;
identifying, based on the at least one of the plurality of images, a first barrier associated with at least one edge of the navigable region and a second barrier associated with at least one edge of the navigable region;
determining a type of the first barrier and a type of the second barrier, wherein the determined type of the first barrier includes a traversable barrier and the determined type of the second barrier includes a non-traversable barrier;
determining a navigational path of the vehicle based on the determined types of the first barrier and the second barrier, wherein the determined navigational path includes traveling through the first barrier in order to avoid the second barrier; and
causing the vehicle to travel on at least a portion of the determined navigational path.

19. The method of claim 18, wherein the first barrier includes a road edge or a curb.

20. The method of claim 18, wherein the second barrier includes a lane dividing structure, another vehicle, a tunnel wall, or a bridge structure.

\* \* \* \* \*